(12) United States Patent
Yan et al.

(10) Patent No.: US 12,543,127 B2
(45) Date of Patent: Feb. 3, 2026

(54) TRANSMIT POWER DETERMINING METHOD AND APPARATUS

(71) Applicant: HUAWEI TECHNOLOGIES CO., LTD., Guangdong (CN)

(72) Inventors: Mao Yan, Chengdu (CN); Yawei Yu, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 227 days.

(21) Appl. No.: 18/347,301

(22) Filed: Jul. 5, 2023

(65) Prior Publication Data

US 2023/0354219 A1 Nov. 2, 2023

Related U.S. Application Data

(63) Continuation of application No. PCT/CN2021/070726, filed on Jan. 7, 2021.

(51) Int. Cl.
*H04W 52/42* (2009.01)
*H04W 52/14* (2009.01)

(52) U.S. Cl.
CPC ......... *H04W 52/42* (2013.01); *H04W 52/146* (2013.01)

(58) Field of Classification Search
CPC ............ H04L 27/2602; H04W 52/146; H04W 52/242; H04W 52/267; H04W 52/367; H04W 52/42
See application file for complete search history.

(56) References Cited

U.S. PATENT DOCUMENTS

| 2019/0313442 | A1 | 10/2019 | Hosseini et al. |
| 2019/0327759 | A1* | 10/2019 | Lee .......... H04L 5/0053 |
| 2020/0186311 | A1 | 6/2020 | Xu et al. |

FOREIGN PATENT DOCUMENTS

| CN | 103379598 A | 10/2013 |
| CN | 103428774 A | 12/2013 |
| CN | 107105494 A | 8/2017 |
| CN | 108024347 A | 5/2018 |
| CN | 108809543 A | 11/2018 |
| CN | 111769911 A | 10/2020 |
| CN | 111901858 A | 11/2020 |
| EP | 3675576 A1 | 7/2020 |
| RU | 2701380 C1 | 9/2019 |
| WO | 2019191912 A1 | 10/2019 |
| WO | 2020143514 A1 | 7/2020 |

(Continued)

OTHER PUBLICATIONS

Office Action in Russian Appln. No. 2023120356/07(044242), mailed on Jul. 12, 2024, 24 pages (with English translation).

(Continued)

*Primary Examiner* — Nguyen T Vo
(74) *Attorney, Agent, or Firm* — Fish & Richardson P.C.

(57) ABSTRACT

Example transmit power determining methods and apparatus are described. One example method includes determining a first transmit power based on N time domain resources corresponding to a first transport block. The first transport block is sent on the N time domain resources at the first transmit power. The first transmit power is a transmit power of the first transport block on each of the N time domain resources, a size of the N time domain resources is greater than one slot, and N is a positive integer.

19 Claims, 9 Drawing Sheets

Determine first transmit power based on N time domain resources corresponding to a first transport block, where the first transmit power is transmit power of the first transport block on each of the time domain resources, a size of the N time domain resources is greater than one slot, and N is a positive integer — 401

Send the first transport block on the N time domain resources at the first transmit power — 402

(56) References Cited

FOREIGN PATENT DOCUMENTS

| WO | 2020166624 A1 | 8/2020 |
|---|---|---|
| WO | 2020199720 A1 | 10/2020 |

OTHER PUBLICATIONS

InterDigital Inc., "PUSCH coverage enhancements," 3GPP TSG RAN WG1 #103-e, R1-2009168, e-Meeting, Oct. 26-Nov. 13, 2020, 16 pages.

Extended European Search Report in European Appln No. 21916792. 1, dated Jan. 4, 2024, 10 pages.

Ericsson, "Text proposal on PCH coverage extension using smaller transport block size," 3GPP TSG-RAN WG1 Meeting #80, R1-150337, Athens, Greece, Feb. 9-13, 2015, 4 pages.

3GPP TS 38.331 v16.2.0, "3rd Generation Partnership Project; Technical Specification Group Radio Access Network; NR; Radio Resource Control (RRC) protocol specification (Release 16)," Sep. 2020, 921 pages.

3GPP TS 38.321 V16.2.1, "3rd Generation Partnership Project; Technical Specification Group Radio Access Network; NR; Medium Access Control (MAC) protocol specification (Release 16)," Sep. 2020, 154 pages.

3GPP TS 38.300 V16.3.0, "3rd Generation Partnership Project; Technical Specification Group Radio Access Network; NR; NR and NG-RAN Overall Description; Stage 2 (Release 16)," Sep. 2020, 148 pages.

3GPP TS 38.215 V16.3.0, "3rd Generation Partnership Project; Technical Specification Group Radio Access Network; NR; Physical layer measurements (Release 16)," Sep. 2020, 25 pages.

3GPP TS 38.214 V16.3.0, "3rd Generation Partnership Project; Technical Specification Group Radio Access Network; NR; Physical layer procedures for data (Release 16)," Sep. 2020, 166 pages.

3GPP TS 38.213 V16.3.0, "3rd Generation Partnership Project; Technical Specification Group Radio Access Network; NR; Physical layer procedures for control (Release 16)," Sep. 2020, 179 pages.

3GPP TS 38.212 V15.10.0, "3rd Generation Partnership Project; Technical Specification Group Radio Access Network; NR; Multiplexing and channel coding (Release 15)," Sep. 2020, 101 pages.

3GPP TS 38.211 V16.3.0, "3rd Generation Partnership Project; Technical Specification Group Radio Access Network; NR; Physical channels and modulation (Release 16)," Sep. 2020, 133 pages.

3GPP TS 38.101-3 V16.5.0, "3rd Generation Partnership Project; Technical Specification Group Radio Access Network; NR; User Equipment (UE) radio transmission and reception; Part 3: Range 1 and Range 2 Interworking operation with other radios (Release 16)," Sep. 2020, 496 pages.

3GPP TS 38.101-2 V16.5.0, "3rd Generation Partnership Project; Technical Specification Group Radio Access Network; NR; User Equipment (UE) radio transmission and reception; Part 2: Range 2 Standalone (Release 16)," Sep. 2020, 181 pages.

3GPP TS 38.101-1 V15.11.0 "3rd Generation Partnership Project; Technical Specification Group Radio Access Network; NR; User Equipment (UE) radio transmission and reception;Part 1: Range 1 Standalone (Release 15)," Sep. 2020, 239 pages.

3GPP TS 38.133 V16.5.0, "3rd Generation Partnership Project; Technical Specification Group Radio Access Network; NR; Requirements for support of radio resource management (Release 16)," Sep. 2020, 1608 pages.

International Search Report and Written Opinion in International Appln. No. PCT/CN2021/070726, mailed on Sep. 23, 2021, 18 pages (with English translation).

ZTE, "Remaining issues on PUSCH enhancements for NR URLLC," 3GPP TSG RAN WG1 #100bis, R1-2001613, e-Meeting, Apr. 20-24, 2020, 16 pages.

* cited by examiner

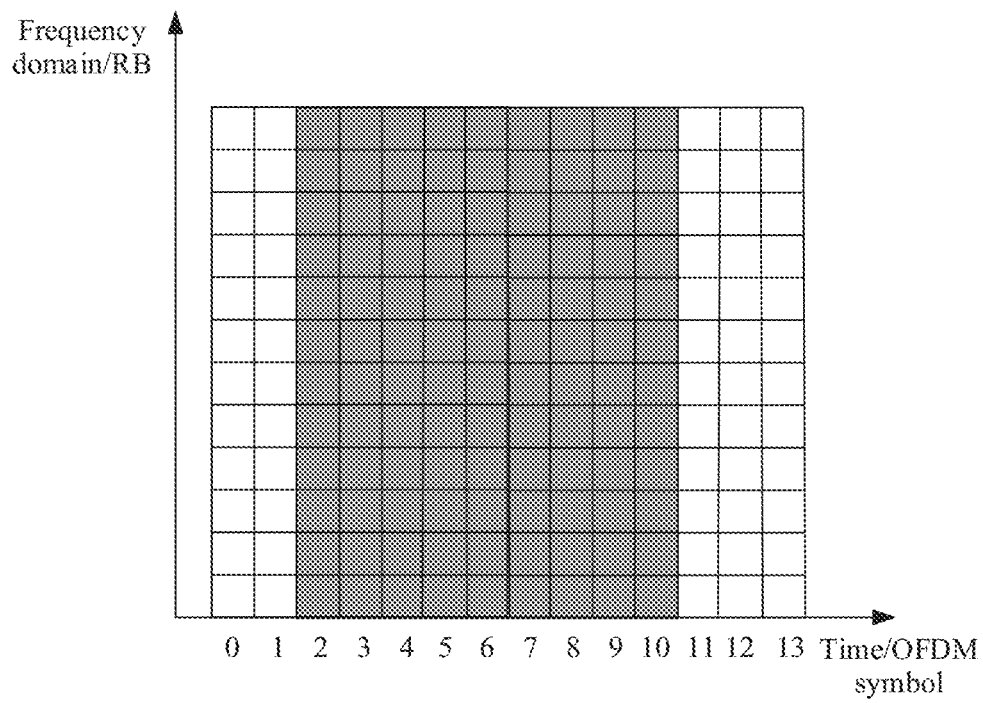

FIG. 3

```
Determine first transmit power based on N time domain resources
corresponding to a first transport block, where the first transmit power is
transmit power of the first transport block on each of the time domain
resources, a size of the N time domain resources is greater than one slot, and
N is a positive integer                                                         — 401

Send the first transport block on the N time domain resources at the first     — 402
                          transmit power
```

FIG. 4

TRANSMIT POWER DETERMINING METHOD AND APPARATUS

CROSS-REFERENCE TO RELATED APPLICATIONS

This application is a continuation of International Application No. PCT/CN2021/070726, filed on Jan. 7, 2021, the disclosure of which is hereby incorporated by reference in its entirety.

TECHNICAL FIELD

This application relates to the field of communication technologies, and in particular, to a transmit power determining method and an apparatus.

BACKGROUND

In a communication system, a terminal device may send data to a network device through a physical uplink channel, to implement uplink communication. To ensure uplink communication performance, transmit power of the terminal device usually needs to be controlled, so that the transmit power of the terminal device is controlled to be within an appropriate range. Ensuring that the transmit power of the terminal device is controlled to be within the appropriate range can ensure effective data transmission, and can reduce interference to another device as much as possible.

Therefore, how to control the transmit power to be within the appropriate range is a problem to be resolved urgently.

SUMMARY

This application provides a transmit power determining method and an apparatus, to control transmit power to be within an appropriate range.

According to a first aspect, this application provides a transmit power determining method. The method includes: determining first transmit power based on N time domain resources corresponding to a first transport block, where the first transmit power is transmit power of the first transport block on each of the time domain resources, a size of the N time domain resources is greater than one slot, and N is a positive integer; and sending the first transport block on the N time domain resources at the first transmit power.

In this embodiment of this application, N is a positive integer, for example, N=1, N=2, or N=3. A value of N is not limited in this embodiment of this application. That the size of the N time domain resources is greater than one slot may be understood as: A length occupied by the N time domain resources is greater than one slot; or the N time domain resources are distributed in at least two slots; or a quantity of slots occupied by the N time domain resources is greater than 1. The N time domain resources may be consecutive or inconsecutive.

It may be understood that, although the transmit power on each time domain resource is referred to as the first transmit power, whether transmit power (that is, first transmit power) on all time domain resources is the same is not limited in this embodiment of this application.

It may be understood that the foregoing method may be replaced with: determining first transmit power based on N time domain resources corresponding to a first signal, where the first transmit power is transmit power on each of the time domain resources, a size of the N time domain resources is greater than one slot, and N is a positive integer; and sending the first signal on the N time domain resources at the first transmit power.

For example, the first signal may include a physical uplink shared channel (PUSCH) or the like. A specific type of the first signal is not limited in this embodiment of this application. For descriptions of the N time domain resources and the first transmit power, refer to the foregoing method. Details are not described herein again.

In this embodiment of this application, the first transmit power is associated with the N time domain resources corresponding to the transport block, so that a terminal device can determine the first transmit power based on the N time domain resources. This ensures that the first transmit power is controlled to be within an appropriate range, and ensures that the terminal device can appropriately control transmit power. In this way, a case in which a network device fails to receive the transport block is improved, or interference to another terminal device may be reduced.

In a possible implementation, the N time domain resources include K orthogonal frequency division multiplexing (OFDM) symbols, the K OFDM symbols occupy at least two slots, and K is a positive integer greater than 14.

In other words, the K OFDM symbols are distributed in at least two slots.

In a possible implementation, K is equal to 14, or K is a positive integer less than 14.

For example, the N time domain resources may be distributed in at least two slots. However, a total length of OFDM symbols included in the N time domain resources may be equal to 14, less than 14 (and greater than 2), or the like.

In a possible implementation, the first transmit power is further determined based on at least one piece of the following information: a frequency domain resource corresponding to the first transport block, a modulation order of the first transport block, a target coding rate of the first transport block, and a size of the first transport block.

In this embodiment of this application, the modulation order (for example, $Q_m$) of the first transport block may be used to determine a transmit power offset (for example, BPRE) or the like. The target coding rate of the first transport block is, for example, an MCS (for example, deltaMCS) of the first transport block. For example, the target coding rate may be used to determine a transmit power offset (for example, $K_s$). The size of the first transport block is, for example, a size of a code block included in the first transport block. For example, the size of the first transport block may be used to determine a transmit power offset (for example, BPRE). In other words, the first transmit power may be determined based on N, and may be determined based on one or more of the foregoing.

In a possible implementation, the first transmit power satisfies the following formula:

$$P = \min\{P_{CMAX}, P_O + 10\log_{10}(y(M)) + \alpha \times PL + \Delta + F + \delta(N)\} \text{ [dBm]}.$$

Herein, P represents the first transmit power, $P_{CMAX}$ represents maximum transmit power of the first transport block, $P_O$ represents target power of the first transport block, y(M) is related to a bandwidth M of the first transport block, α represents a path loss amplification factor, PL represents a path loss estimate, A represents an offset of transmit power of the first transport block, and F represents an accumulated power adjustment value of the transmit power of the first transport block; and δ(N) is a function of N; or any one or more of $P_O$, y(M), α×PL, Δ, or F is/are determined by N, and δ(N) is equal to 0; or any one or more of $P_O$, y(M), α×PL, Δ, or F is/are determined by N, and δ(N) is a function of N.

In a possible implementation, a physical channel corresponding to the first transport block includes a physical uplink shared channel PUSCH; and $$P_{CMAX}=P_{CMAX,f,c}(i), P_O=P_{O\_PUSCH,b,f,c}(j),$$
$$\alpha \times PL=\alpha_{b,f,c}(j) \times PL_{b,f,c}(q_d), \Delta=\Delta_{TF,f,c}(j), \text{ and}$$
$$F=f_{b,f,c}(i, l).$$

Herein, f represents an index of a carrier, c represents an index of a serving cell, i represents an index of a transmission occasion, b represents an index of an active uplink bandwidth part, j represents an index of a parameter set configuration, u represents an index of a subcarrier spacing, $q_d$ represents an index of a reference signal, and l represents an index of a power control adjustment state.

It may be understood that, in this application, to facilitate distinguishing between the index f of the carrier and the accumulated power adjustment value of the transmit power of the first transport block, the accumulated power adjustment value is represented by F, but this should not be understood as a limitation on this embodiment of this application. For example, F may alternatively be represented by $f_{b,f,c}(i, l)$.

For example, the first transmit power satisfies the following formula:

$$P_{PUSCH,b,f,c}(i, j, q_d, l)=\min\{P_{CMAX,f,c}(i),$$
$$P_{O\_PUSCH,b,f,c}(j)+10 \log_{10}(y(M))+\alpha_{b,f,c}(j) \times PL_{b,f,c}$$
$$(q_d)+\Delta_{TF,f,c}(j)+f_{b,f,c}(i, l)\} \text{ [dBm]}.$$

It may be understood that for descriptions of letters in the foregoing formula, refer to the foregoing descriptions, or refer to descriptions in the following embodiments. Details are not described herein again.

In a possible implementation, $P_O$ satisfies the following formula:

$$P_O=P_{O\_NOMINAL}+P_{O\_UE}.$$

Herein, $P_{O\_NOMINAL}$ is determined by a function of N, and/or $P_{O\_UE}$ is determined by the function of N.

For example, $P_O$ satisfies the following formula:

$$P_{O\_PUSCH,b,f,c}(j)P_{O\_NOMINAL\_PUSCH,f,c}(j)+$$
$$P_{O\_UE\_PUSCH,b,f,c}(j), \text{ where } j \in \{0, 1, \ldots, J-1\}.$$

In a possible implementation, the function of N is $10 \log_{10}(N)$; or the function of N is $-\text{round}(10 \log_{10}(N))$; or the function of N is $1/(N+1)$.

In a possible implementation, y(M) satisfies the following formula:

$$y(M)=2^\mu \times M_{RB}/N.$$

Herein, u represents the index of the subcarrier spacing, and $M_{RB}$ represents a quantity of resource blocks RBs corresponding to the first transport block.

Alternatively, y(M) satisfies the following formula:

$$y(M)=2^\mu \times M_{RB,b,f,c}^{PUSCH}(i)/N.$$

For example, according to the foregoing y(M), the first transmit power may be shown as follows:

$$P_{PUSCH,b,f,c}(i, j, q_d, l)=\min\{P_{CMAX,f,c}(i)P_{O\_PUSCH,b,f,c}$$
$$(j)+10 \log_{10}(2^\mu \times M_{RB,b,f,c}^{PUSCH}(i)/N)+\alpha_{b,f,c}(j) \times$$
$$PL_{b,f,c}(q_d)+\Delta_{TF,f,c}(j)+f_{b,f,c}(i, l)\} \text{ [dBm]}.$$

In a possible implementation, Δ satisfies the following formula:

$$\Delta=10 \log_{10}((2^{BPRE \times K_s}-1) \times \beta_{offset}); \text{ and}$$

$$BPRE=\Sigma_{r=0}^{C-1} K_r/N_{RE}.$$

Herein, C represents a quantity of code blocks corresponding to the first transport block; $K_r$ represents a size of an $r^{th}$ code block; $N_{RE}$ represents a quantity of resource elements (RE) corresponding to the first transport block; $N_{RE}$ is determined by a quantity of OFDM symbols of the first transport block in an $s^{th}$ time domain resource, where the $s^{th}$ time domain resource is included in the N time domain resources; or $N_{RE}$ is determined by a quantity of OFDM symbols of the first transport block in each of the N time domain resources; $K_s$ is configured by a network device or is defined in a protocol; and $\beta_{offset}$ is an offset.

Alternatively, Δ satisfies the following formula:

$$\Delta_{TF,f,c}(j)=10 \log_{10}((2^{BPRE \times K_s}-1) \times \beta_{offset}^{PUSCH}).$$

For example, for uplink data, $BPRE=\Sigma_{r=0}^{C-1} K_r/N_{RE}$. For channel state information (CSI), $BPRE=Q_m/\beta_{offset}^{PUSCH}$. Herein, C is a quantity of sent code blocks, $K_r$ is a size of an $r^{th}$ code block, $N_{RE}$ is a quantity of REs, and $Q_m$ represents a modulation order. If the PUSCH includes uplink data, $\beta_{offset}^{PUSCH}=1$. If the PUSCH includes only CSI, $\beta_{offset}^{PUSCH}=\beta_{offset}^{CSI,1}$, where $\beta_{offset}^{CSI,1}$ is a power offset corresponding to the CSI.

In a possible implementation, $N_{RE}$ satisfies the following formula:

$$N_{RE}=M_{RB,b,f,c}^{PUSCH}(i) \times \Sigma_{s=0}^{N-1}$$
$$\Sigma_{j=0}^{N_{symb,b,f,c}^{PUSCH}-1} N_{sc,data}^{RB}(i, j, s).$$

Herein, $N_{symb,b,f,c}^{PUSCH}(i, s)$ represents a quantity of OFDM symbols of a transmission occasion i of the PUSCH in the $s^{th}$ time domain resource, $N_{sc,data}^{RB}(i, j, s)$ represents a quantity of REs other than those for a reference signal on an OFDM symbol j of the transmission occasion i of the PUSCH in the $s^{th}$ time domain resource, and the $s^{th}$ time domain resource is included in the N time domain resources.

Alternatively, $N_{RE}$ satisfies the following formula:

$$N_{RE}=M_{RB,b,f,c}^{PUSCH}(i) \times N \times \Sigma_{j=0}^{N_{symb,b,f,c}^{PUSCH}(i)-1}$$
$$N_{sc,data}^{RB}(i, j).$$

Herein, $N_{symb,b,f,c}^{PUSCH}(i)$ represents a quantity of OFDM symbols of a transmission occasion i of the PUSCH in each of the N time domain resources, and $N_{sc,data}^{RB}(i, j)$ represents a quantity of REs other than those for a reference signal on an OFDM symbol j of the transmission occasion i of the PUSCH in each of the N time domain resources.

In a possible implementation, F is determined by a function of N, and the function of N is $10 \log_{10}(N)$.

Alternatively, F satisfies the following formula:

$$f_{b,f,c}(i, l)=f_{b,f,c}(i-i_0, l)+\Sigma_{m=0}^{\mathcal{C}(D_i)-1} \delta_{PUSCH,b,f,c}(m, l).$$

For example, a quantity of slots to which the first transport block is mapped in a PUSCH transmission occasion i is N(i), a quantity of slots to which the first transport block is mapped in a PUSCH transmission occasion $i-i_0$ is $N(i-i_0)$, and the first transmit power may be related to N(i) and $N(i-i_0)$.

For example, the power adjustment value $\delta_{PUSCH,b,f,c}(m,l)$ may also be related to N(i) and/or $N(i-i_0)$, and $i_0$ is an integer.

It may be understood that for descriptions of the first transmit power or the foregoing parameters, refer to the following embodiments. Details are not described herein again.

For example, in each parameter such as $N_{sc,data}^{RB}(i, j)$, $N_{symb,b,f,c}^{PUSCH}(i)$, $N_{symb,b,f,c}^{PUSCH}(i, s)$, $N_{sc,data}^{RB}(i, j, s)$, and $N_{RE}$ shown in this application, although the parameter includes N, the parameter shown herein may be understood as a whole. In other words, N in each parameter shown herein may have a different meaning from N in the N time domain resources shown in this application.

According to a second aspect, this application provides a communication apparatus, configured to perform the method according to any one of the first aspect or the possible implementations of the first aspect. The communication apparatus includes corresponding units configured to perform the method in any one of the first aspect or the possible implementations of the first aspect.

For example, the communication apparatus may be a terminal device, a chip in a terminal device, or the like.

According to a third aspect, this application provides a communication apparatus. The communication apparatus includes a processor, configured to perform the method according to any one of the first aspect or the possible implementations of the first aspect. Alternatively, the processor is configured to execute a program (for example, computer-executable instructions, a computer program, or computer code) stored in a memory. When the program is executed, the method shown in any one of the first aspect or the possible implementations of the first aspect is performed.

In a process of performing the foregoing method, a process of sending information (for example, sending a first transport block or sending a first signal) in the foregoing method may be understood as a process of outputting the information by the processor. When the processor outputs the information, the processor outputs the information to a transceiver, so that the transceiver transmits the information. After the information is output by the processor, other processing may further need to be performed on the information before the information arrives at the transceiver. Similarly, when the processor receives the foregoing input information, the transceiver receives the foregoing information, and inputs the foregoing information into the processor. Further, after the transceiver receives the foregoing information, other processing may need to be performed on the foregoing information before the information is input into the processor.

Based on the foregoing principle, for example, sending the first transport block in the foregoing method may be understood as that the processor outputs a first data block, or sending the first signal may be understood as that the processor outputs the first signal.

Operations such as transmission, sending, and receiving related to the processor may be more generally understood as operations such as input, receiving, and output of the processor, instead of operations such as transmission, sending, and receiving directly performed by a radio frequency circuit and an antenna, unless otherwise specified, or provided that the operations do not contradict actual functions or internal logic of the operations in related descriptions.

In an implementation process, the processor may be a processor specially configured to perform these methods, or a processor, for example, a general-purpose processor, that executes computer instructions in the memory to perform these methods. The memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

In a possible implementation, the memory is located outside the communication apparatus.

In a possible implementation, the memory is located inside the communication apparatus.

In this embodiment of this application, the processor and the memory may alternatively be integrated into one component. In other words, the processor and the memory may alternatively be integrated together.

In a possible implementation, the communication apparatus further includes a transceiver. The transceiver is configured to receive a signal or send a signal. For example, the transceiver may be further configured to send the first transport block and the like.

According to a fourth aspect, this application provides a communication apparatus. The communication apparatus includes a logic circuit and an interface. The logic circuit is coupled to the interface. The logic circuit is configured to determine first transmit power. The interface is configured to output a first transport block, a first signal, or the like.

For example, the logic circuit is configured to determine the first transmit power based on N time domain resources corresponding to the first transport block, and the interface is configured to output the first transport block.

For example, the logic circuit is configured to determine the first transmit power based on N time domain resources corresponding to the first signal, and the interface is configured to output the first signal.

It may be understood that for descriptions of the N time domain resources, the first transmit power, and the like, refer to the foregoing first aspect or the embodiments shown below. Details are not described herein again.

According to a fifth aspect, this application provides a computer-readable storage medium. The computer-readable storage medium is configured to store a computer program or computer code. When the computer program or computer code is run on a computer, the method according to any one of the first aspect or the possible implementations of the first aspect is performed.

According to a sixth aspect, this application provides a computer program product. The computer program product includes a computer program or computer code. When the computer program product runs on a computer, the method according to any one of the first aspect or the possible implementations of the first aspect is performed.

According to a seventh aspect, this application provides a computer program. When the computer program is run on a computer, the method according to any one of the first aspect or the possible implementations of the first aspect is performed.

BRIEF DESCRIPTION OF DRAWINGS

FIG. 3 is a schematic diagram of a time domain resource according to an embodiment of this application;

FIG. 4 is a schematic flowchart of a transmit power determining method according to an embodiment of this application;

DESCRIPTION OF EMBODIMENTS

Figure 1:
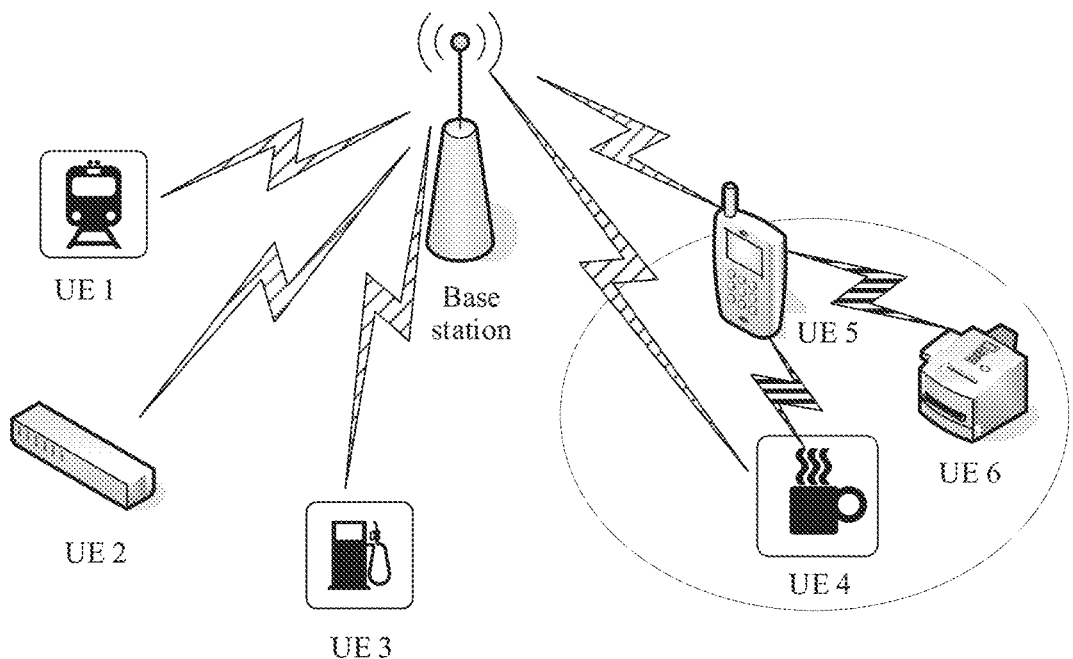
FIG. 1 is a schematic diagram of a communication system according to an embodiment of this application.

To make the objectives, technical solutions, and advantages of this application clearer, the following further describes this application in detail with reference to the accompanying drawings.

The terms "first", "second", and the like in the specification, claims, and accompanying drawings of this application are used to distinguish between different objects, but are not used to describe a specific sequence. In addition, the terms "include" and "have" and any variations thereof are intended to cover non-exclusive inclusion. For example, a process, method, system, product, or device that includes a series of steps or units is not limited to the listed steps or units, but optionally further includes an unlisted step or unit, or optionally further includes another inherent step or unit for the process, method, product, or device.

The "embodiment" mentioned herein means that specific features, structures, or characteristics described with reference to the embodiments may be included in at least one embodiment of this application. Appearance of the phrase at various locations in the specification does not necessarily refer to a same embodiment, or an independent or alternative embodiment mutually exclusive with another embodiment. A person skilled in the art may explicitly and implicitly understand that the embodiments described in this specification may be combined with other embodiments.

In this application, "at least one (piece)" refers to one or more, "a plurality of" refers to two or more, "at least two (pieces)" refers to two, three, or more, and "and/or" is used to describe an association relationship of associated objects, and indicates that three relationships may exist. For example, "A and/or B" may indicate the following three cases: Only A exists, only B exists, and both A and B exist. The character "/" usually indicates an "or" relationship between the associated objects. "At least one of the following items (pieces)" or a similar expression thereof means any combination of these items. For example, at least one of a, b, or c may represent a, b, c, "a and b", "a and c", "b and c", or "a, b, and c".

The technical solutions provided in this application may be applied to various communication systems, for example, a long term evolution (LTE) system, an LTE frequency division duplex (FDD) system, an LTE time division duplex (TDD) system, an internet of things (IoT) system, a narrowband internet of things (NB-IoT) system, a wireless fidelity (Wi-Fi) system, a 5th generation (5G) communication system or a new radio (NR) system, and another future communication system such as a 6th generation mobile communication system.

The technical solutions provided in this application may be further applied to machine type communication (MTC), long term evolution-machine (LTE-M), a device-to-device (D2D) network, a machine-to-machine (M2M) network, an internet of things (IoT) network, or another network. The IoT network may include, for example, an internet of vehicles. Communication modes in an internet of vehicles system are collectively referred to as vehicle to X (V2X, where X may represent anything). For example, V2X may include vehicle to vehicle (vehicle to vehicle, V2V) communication, vehicle to infrastructure (V2I) communication, vehicle to pedestrian (V2P) communication, or vehicle to network (V2N) communication.

The following describes terms in this application in detail.
1. Terminal Device

The terminal device in this application is an apparatus with wireless sending and receiving functions. The terminal device may communicate with an access network device (or may be referred to as an access device) in a radio access network (RAN).

The terminal device may also be referred to as user equipment (UE), an access terminal, a terminal, a subscriber unit, a subscriber station, a mobile station, a remote station, a remote terminal, a mobile device, a user terminal, a user agent, a user apparatus, or the like. In a possible implementation, the terminal device may be deployed on land, and include an indoor or outdoor terminal device, a handheld terminal device, or a vehicle-mounted terminal device; or may be deployed on a water surface (for example, on a ship); or may be deployed in the air (for example, on an aircraft, a balloon, or a satellite). In a possible implementation, the terminal device may be a handheld device having a wireless communication function, a vehicle-mounted device, a wearable device, a sensor, a terminal in the internet of things, a terminal in the internet of vehicles, a terminal device in any form in a 5th generation (5G) network and a future network, or the like. This is not limited in this application.

It may be understood that the terminal device shown in this application may include not only a vehicle (for example, an entire vehicle) in the internet of vehicles, but also a vehicle-mounted device, a vehicle-mounted terminal, or the like in the internet of vehicles. A specific form of the terminal device in the internet of vehicles is not limited in this application.

It may be understood that the terminal devices shown in this application may further communicate by using a technology such as device to device (D2D), vehicle to everything (V2X), or machine to machine (M2M). A method for communication between the terminal devices is not limited in this application.
2. Network Device The network device in this application may be an apparatus that is deployed in a radio access network to provide a wireless communication service for a terminal device. The network device may also be referred to as an access network device, an access device, a RAN device, or the like.

The network device may include but is not limited to: a next-generation NodeB (gNB) in a 5G system, an evolved NodeB (eNB) in an LTE system, a radio network controller (RNC), a NodeB (NB), a base station controller (BSC), a base transceiver station (BTS), a home base station (home evolved NodeB or home NodeB, HNB), a baseband unit (BBU), a transmitting and receiving point (TRP), a transmitting point (TP), a pico base station device (pico), a mobile switching center, a network device in a future network, or the like. Alternatively, the network device may be a device that carries a base station function in D2D, V2X, or M2M, or the like. A specific type of the network device is not limited in this application. In systems using different radio access technologies, devices having network device functions may have different names.

Optionally, in some network device deployments, the network device may include a centralized unit (CU), a distributed unit (DU), and the like. In some other network device deployments, the CU may be further divided into a CU-control plane (CP), a CU-user plane (UP), and the like. In some other network device deployments, the network device may alternatively be an open radio access network (ORAN) architecture or the like. A specific deployment manner of the network device is not limited in this application.

Based on the terminal device and the network device described above, an embodiment of this application provides a communication system. FIG. 1 is a schematic diagram of a communication system according to an embodiment of this application. As shown in FIG. 1, the communication system may include at least one network device, for example, a base station in FIG. 1, and at least one terminal device, for example, UE 1 to UE 6 in FIG. 1. In the communication system, the network device may send a downlink signal such as a PDSCH to the UE 1 to the UE 6, the UE 1 to the UE 6 each may send an uplink signal to the network device, and the network device may further receive the uplink signal.

For example, terminal devices may directly communicate with each other. For example, direct communication between terminal devices may be implemented by using a D2D technology. As shown in FIG. 1, the D2D technology may be used for direct communication between the UE 4 and the UE 5 and between the UE 4 and the UE 6. The UE 4 and the UE 6 may separately or simultaneously communicate with the UE 5. For another example, the UE 4 to the UE 6 may separately communicate with the network device. For example, the UE 4 or the UE 6 may directly communicate with the network device, or may indirectly communicate with the network device. For example, the UE 6 may communicate with the network device by using the UE 5.

It should be understood that, FIG. 1 shows an example of one network device, a plurality of terminal devices, and communication links between the communication devices. Optionally, the communication system may include a plurality of network devices, and coverage of each network device may include another quantity of terminal devices, for example, more or fewer terminal devices. This is not limited in this application.

A plurality of antennas may be configured for each of the foregoing communication devices, such as the base station and the UE 1 to the UE 6 in FIG. 1. The plurality of antennas may include at least one transmit antenna configured to send a signal, at least one receive antenna configured to receive a signal, and the like. A specific structure of each communication device is not limited in this embodiment of this application. Optionally, the communication system may further include another network entity such as a network controller or a mobility management entity. This is not limited in this embodiment of this application.

It may be understood that, for a communication system to which a reference signal sequence determining method provided in this application is applicable, details are not described below.

3. Subcarrier Spacing

The subcarrier spacing belongs to a parameter set (which may also be referred to as a waveform parameter, a numerology, or the like) in a communication system. The parameter set may be used to define one or more of the following parameters: the subcarrier spacing, a cyclic prefix (CP), a time unit, a bandwidth, and the like. For example, CP information may include a CP length and/or a CP type. For example, the CP may be a normal CP NCP) or an extended CP (ECP). The foregoing time unit is a time unit in time domain. For example, the time unit may be a sampling point, a symbol, a mini-slot, a slot, a subframe, a radio frame, or the like. For example, a relationship between a subcarrier spacing index $\mu$ and a subcarrier spacing may be shown in Table 1. Time unit information may include a type, a length, a structure, or the like of a time unit. [TS 38.211, Table 4.2-1: Supported transmission numerologies] defines the following.

TABLE 1

| $\mu$ | $\Delta f = 2^\mu \times 15$ [kHz] | Cyclic prefix |
|---|---|---|
| 0 | 15 | Normal |
| 1 | 30 | Normal |
| 2 | 60 | Normal, extended |
| 3 | 120 | Normal |
| 4 | 240 | Normal |

It may be understood that for content shown in Table 1, refer to a related standard or protocol, such as TS 38.211, Table 4.2-1. Details are not described herein again. It may be understood that the subcarrier spacing shown above may alternatively have another value or the like. This is not limited in this application.

Symbols shown below in this application are defined as follows: For example, $\lceil \cdot \rceil$ may represent rounding up, or rounding up may be represented by ceil($\cdot$). For another example, $\lfloor \cdot \rfloor$ may represent rounding down, or rounding down may be represented by floor($\cdot$). mod or % may represent a modulo operation. For example, mod(x,y) may represent a modulo operation of x on y, and may also be represented as x mod y, x % y, or the like.

It may be understood that the foregoing descriptions of the terminal device, the network device, the communication system, and the subcarrier spacing are also applicable to the embodiments shown below. The descriptions of the terminal device, the network device, the communication system, and the subcarrier spacing are not provided below again.

Figure 2:
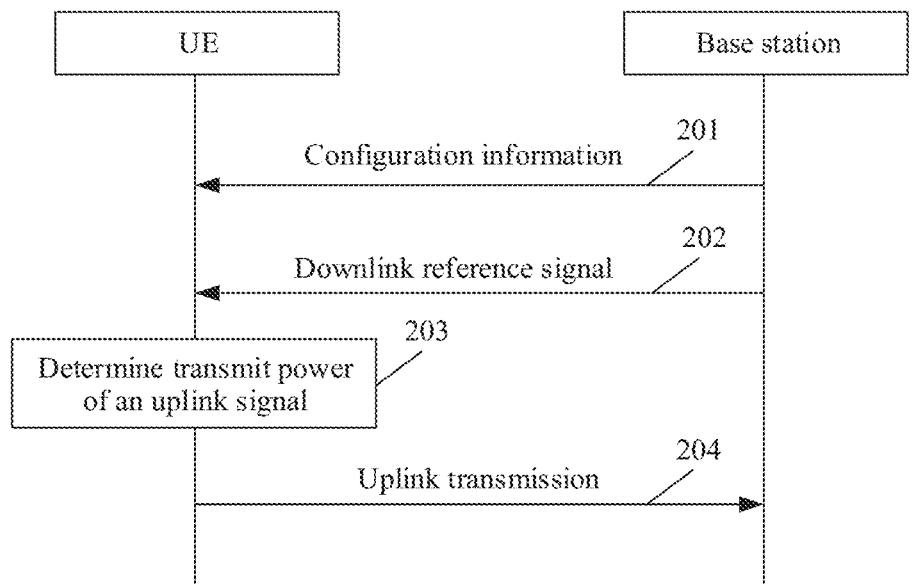
FIG. 2 is a schematic flowchart of a transmit power determining method according to an embodiment of this application.

FIG. 2 is a schematic flowchart of a transmit power determining method according to an embodiment of this application. As shown in FIG. 2, the method includes the following steps.

201: A base station sends configuration information to UE. Correspondingly, the UE receives the configuration information. The configuration information may include one or more of transmit power of a reference signal, a time/frequency position (which may also be referred to as a time domain resource/frequency domain resource), uplink power control, or the like. It may be understood that, for step 201, the configuration information sent by the base station may be received when the UE is downlink-synchronized with the base station or accesses the base station.

For example, if the configuration information includes uplink power control information, the configuration information may include a cell-common power control parameter and/or a UE-specific power control parameter. If the specific power control parameter is not configured for the UE, the UE may determine uplink transmit power by using the cell-common power control parameter.

For example, a signaling format of the cell-common power control parameter may be shown as follows:

```
PUSCH-ConfigCommon ::=    SEQUENCE {
msg3-DeltaPreamble        INTEGER(-1..6)     OPTIONAL,
p0-NominalWithGrant       INTEGER (-202..24) OPTIONAL,
...}
```

Herein, PUSCH-ConfigCommon represents a common configuration (PUSCH-configcommon) of a physical uplink shared channel (PUSCH). msg3-DeltaPreamble represents a power offset between a message 3 (Msg3) and a random access preamble. For example, the power offset may be any number in a range of −1 to 6. p0-NominalWithGrant represents a nominal P0 value corresponding to the PUSCH, and the nominal P0 value may be any number in a range of −202 to 24. It may be understood that the foregoing OPTIONAL may indicate that a corresponding parameter may be configured, or may not be configured. For example, a corresponding parameter msg3-DeltaPreamble may be configured, or a corresponding parameter p0-NominalWithGrant may be configured.

For example, a signaling format of the UE-specific power control parameter may be shown as follows:

```
PUSCH-PowerControl ::=    SEQUENCE {
tpc-Accumulation          ENUMERATED { disabled }        OPTIONAL,
msg3-Alpha                Alpha                          OPTIONAL,
p0-Nominal WithoutGrant   INTEGER (−202..24)             OPTIONAL,
p0-AlphaSets              SEQUENCE (SIZE
(1..maxNrofP0-PUSCH-AlphaSets)) OF P0-PUSCH-AlphaSet                    OPTIONAL
pathlossReferenceRSToAddModList   SEQUENCE (SIZE
(1..maxNrofPUSCH-PathlossReferenceRSs)) OF PUSCH-PathlossReferenceRS
OPTIONAL,
deltaMCS                  ENUMERATED {enabled}           OPTIONAL,
...}
P0-PUSCH-AlphaSet    SEQUENCE {
P0-PUSCH-AlphaSetId,
P0                        INTEGER (−16..15)    OPTIONAL,
alpha                                          OPTIONAL
}
```

Herein, tpc-Accumulation is used to indicate whether transmit power control (TPC) is accumulated. For example, if this field is configured, it is considered that a TPC value is accumulated. For example, this parameter may be used to determine $f_{b,f,c}(i, 1)$ in Formula (1). msg3-Alpha represents a weight factor during Msg3 power control. p0-NominalWithoutGrant represents a nominal p0 value during semi-persistent scheduling or grant free. p0-AlphaSets represents a possible set of a p0 value and an alpha value that are corresponding to a PUSCH. For example, this parameter may be used to determine $PL_{b,f,c}(q_d)$ shown in Formula (1). pathlossReferenceRSToAddModList is used to estimate a p0 value of a path loss reference signal corresponding to the PUSCH. deltaMCS indicates power adjustment enabling corresponding to an MCS, and for example, may be used to determine $\Delta_{TF,f,c})$ shown in Formula (1) (for example, an explanation of this parameter in a related standard or protocol is as follows: Indicates whether to apply delta MCS. When the field is absent, the UE applies $K_s=0$ in delta_TFC formula for PUSCH, where TFC refers to a transport format combination, and for example, may be written as $\Delta_{TF,f,c}(j)$ in 38.213). P0-PUSCH-AlphaSet represents a possible set of a p0 value and an alpha value that are corresponding to a PUSCH. For example, this parameter may be used to determine $P_{O\_PUSCH,b,f,c}(j)$ shown in Formula (1). P0-PUSCH-AlphaSetId represents an index of the set of the p0 value and the alpha value that are corresponding to the PUSCH. P0 is the p0 value corresponding to the PUSCH, and alpha is the alpha value corresponding to the PUSCH.

It may be understood that the nominal p0 value shown above may be considered as reference target receive power of the PUSCH, p0 in P0-PUSCH-AlphaSet may be considered as a UE-specific power adjustment value, and p0 may be used to perform power control for different UE.

202: The base station sends a downlink reference signal at specific transmit power. Correspondingly, the UE receives the downlink reference signal.

It may be understood that the specific transmit power shown herein is transmit power corresponding to the base station.

Generally, a reference signal (RS) may also be referred to as a demodulation reference signal (DMRS), a channel state information reference signal (CSI-RS), a phase tracking reference signal (PTRS), a sounding reference signal (SRS), or the like based on a function. For example, the reference signal means that a transmit end or a receive end knows or can deduce, according to a predetermined rule, a time and frequency position of a signal, and a signal/symbol carried in a time and a frequency. The reference signal is a known signal used to obtain impact of the outside (for example, a spatial channel, or non-ideality of a transmit or receive end device) on a signal during transmission. The reference signal may be generally used for channel estimation, auxiliary signal demodulation, detection, and the like. For example, the DMRS and the CSI-RS are used to obtain channel information, and the PTRS is used to obtain phase change information.

The downlink reference signal shown herein is a reference signal sent by the base station to the UE.

It may be understood that the base station may not only send the downlink reference signal to the UE, but also perform more uplink or downlink communication with the UE. For example, the base station may further perform signaling exchange, capability interaction, security authentication, or the like with the UE. For example, signaling may include an uplink scheduling grant, and the uplink scheduling grant is used to specify information such as a time or frequency resource, a modulation and coding scheme (MCS), or power control required for uplink transmission. The MCS may be used to determine information such as a modulation order and/or a target coding rate of data.

203: The UE determines transmit power of an uplink signal.

For example, the UE may determine a path loss (PL) between the base station and the UE based on the configuration information and reference signal received power (RSRP). For example, the configuration information includes a p0 value used to estimate a path loss reference signal corresponding to a PUSCH.

For example, the UE may further determine the transmit power of the uplink signal based on the configuration information, the path loss, and the like.

It may be understood that, for a method for determining the transmit power of the uplink signal by the UE, refer to the following, for example, Formula (1) to Formula (4). Details are not described herein.

204: The UE sends the uplink signal based on the determined transmit power. That is, the UE may perform uplink transmission (PUSCH transmission) through a PUSCH.

The PUSCH may be used to carry a data signal, a control signal, or the like. This is not limited in this embodiment of this application.

In addition, in a random access process, after the UE sends a random access message 1 (also referred to as Msg1), the base station sends a random access response (also referred to as message 2 or Msg2) to the UE. The random access response (RAR) may carry an uplink grant (UL grant). The uplink grant may be used to schedule an uplink transmission message, and the message may be referred to as a message 3 (also referred to as Msg3). In other words, the message 3 is uplink information sent by the UE to the base station, and is special information carried on the PUSCH. In other words, the PUSCH shown in this embodiment of this application may be used to carry the Msg3.

It may be understood that transmit power is described below with reference to a related standard or protocol. It may be understood that for a part that is not described in detail in the following formula, refer to the related standard or protocol. This is not limited in this embodiment of this application.

In new radio (NR), using a PUSCH as an example, when UE performs uplink transmission, power of the PUSCH may satisfy the following formula:

$$P_{PUSCH,b,f,c}(i, j, q_d, l) = \min\{P_{CMAX,f,c}(i), P_{O\_PUSCH,b,f,c}(j) + 10\log_{10}(2^{\mu} \times M_{RB,b,f,c}^{PUSCH}(i)) + \alpha_{b,f,c}(j) \times PL_{b,f,c}(q_d) + \Delta_{TF,f,c}(j) + f_{b,f,c}(i, l)\}$$
$$[dBm] \quad (1)$$

Herein, b represents an active uplink bandwidth part (UL BWP) index (which may also be referred to as an index of an active uplink bandwidth part), f represents a carrier index (which may also be referred to as an index of a carrier), c represents a serving cell index (which may also be referred to as an index of a serving cell), j represents a parameter set configuration index (which may also be referred to as an index of a parameter set configuration), l represents a PUSCH power control adjustment state index (which may also be referred to as an index of a PUSCH power control adjustment state), i represents a PUSCH transmission occasion (PUSCH transmission occasion) index (which may also be referred to as an index of a PUSCH transmission occasion), and μ represents a subcarrier spacing index (which may also be referred to as an index of a subcarrier spacing).

It may be understood that Formula (1) may be represented as follows in the related standard or protocol:

If UE sends a PUSCH on an active uplink bandwidth part of a carrier of a serving cell by using a parameter set configuration with an index and a PUSCH power control adjustment state with an index, the UE determines PUSCH transmit power in a PUSCH transmission occasion as Formula (1): $P_{PUSCH}^{b,f,c}(i, j, q_d, l) = \min\{P_{CMAX}^{f,c}(i), P_{O\_PUSCH}^{b,f,c}(j) + 10\log_{10}(2^{\mu} \cdot M_{RB,b,f,c}^{PUSCH}(i)) + \alpha_{b,f,c}(j) PL_{b,f,c}(q_d) + \Delta_{TF,f,c}(j) + f_{b,f,c}(i, l)\}$. (This may be represented as follows in the related standard or protocol: If a UE transmits a PUSCH on active UL BWP b of carrier f of serving cell c using parameter set configuration with index j and PUSCH power $P_{PUSCH}^{b,f,c}(i, j, q_d, l)$ control adjustment state with index l, the UE determines the PUSCH transmission power in PUSCH transmission occasion i as $P_{PUSCH}^{b,f,c}(i, j, q_d, l) = \min\{P_{CMAX}^{f,c}(i), P_{O\_PUSCH}^{b,f,c}(j) + 10\log_{10}(2^{\mu} \cdot M_{RB,b,f,c}^{PUSCH}(i)) + \alpha_{b,f,c}(j) PL_{b,f,c}(q_d) + \Delta_{TF,f,c}(j) + f_{b,f,c}(i, l)\}$.)

Herein, $P_{CMAX,f,c}(i)$ represents terminal configured maximum output power for a carrier f of a serving cell c in a PUSCH transmission occasion i. (This may be represented as follows in the related standard or protocol: $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.) It may be understood that English in the brackets in embodiments of this application may be understood as a representation of the foregoing in a corresponding standard or protocol. For this explanation, details are not described below again. It may be understood that multiplication shown in this application may be represented by x, or may be represented by a dot.

$P_{O\_PUSCH,b,f,c}(j)$ satisfies the following formula:

$$P_{O\_PUSCH,b,f,c}(j) = P_{O\_NOMINAL\_PUSCH,f,c}(j) + P_{O\_UE\_PUSCH,b,f,c}(j) \quad (2)$$

Herein, $j \in \{0, 1, \ldots, J-1\}$. ($P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$, where $j \in \{0, 1, \ldots, J-1\}$.)

For Formula (2), if UE establishes a dedicated radio resource control (radio resource control, RRC) connection by using a type-1 (Type-1, that is, a four-step random access procedure) random access response procedure, and is not configured with P0-PUSCH-AlphaSet, or is not sent an uplink grant (UL grant) in a random access response (RAR), j=0, $P_{O\_UE\_PUSCH}^{b,f,c}(0)=0$, $P_{O\_NOMINAL\_PUSCH}^{f,c}(0)=P_{O\_PRE}+\Delta_{PREAMBLE\_Msg3}$. Herein, $P_{O\_PRE}$ represents preamble received target power, and is specified by a higher-layer parameter preambleReceivedTargetPower configured by a base station. $\Delta_{PREAMBLE\_Msg3}$ is a power offset between a random access message 3 (which may also be referred to as Msg3) and a random access preamble, and is specified by msg3-DeltaPreamble in configuration information. If not configured, $\Delta_{PREAMBLE\_Msg3}=0$. (If a UE established dedicated RRC connection using a Type-1 random access procedure, as described in Clause 8, and is not provided P0-PUSCH-AlphaSet or for a PUSCH transmission scheduled by a RAR UL grant as described in Clause 8.3, j=0, $P_{O\_UE\_PUSCH}^{b,f,c}(0)=0$, and $P_{O\_NOMINAL\_PUSCH}^{f,c}(0)=P_{O\_PRE}+\Delta_{PREAMBLE\_Msg3}$, where $P_{O\_PRE}$ is provided by preambleReceivedTargetPower [TS 38.321] and $\Delta_{PREAMBLE\_Msg3}$ is provided by msg3-DeltaPreamble, or $\Delta_{PREAMBLE\_Msg3}=0$ dB if msg3-DeltaPreamble is not provided, for carrier f of serving cell c.)

For Formula (2), if UE establishes a dedicated radio resource control (RRC) connection by using a type-2 (Type-2, that is, a two-step random access procedure) random access response procedure, when a PUSCH is sent in the two-step random access response procedure, j=0, $P_{O\_UE\_PUSCH,b,f,c}(0)=0$, $P_{O\_NOMINAL\_PUSCH,f,c}(0)=P_{O\_PRE}+\Delta_{MsgA\_PUSCH}$. Herein, $P_{O\_PRE}$ represents preamble received target power (specified by a higher-layer parameter preambleReceivedTargetPower configured by a base station). $\Delta_{MsgA\_PUSCH}$ is a transmit power offset between a random access message A PUSCH and a random access preamble, and is specified by msgA-DeltaPreamble in configuration information. If not configured, $\Delta_{MsgA\_PUSCH}=\Delta_{PREAMBLE\_Msg3}$ by default. (If a UE established dedicated RRC connection using a Type-2 random access procedure, as described in Clause 8, and is not provided P0-PUSCH-AlphaSet, or for a PUSCH transmission for Type-2 random access procedure as described in Clause 8.1A, j=0, $P_{O\_UE\_PUSCH,b,f,c}(0)=0$, and $P_{O\_NOMINAL\_PUSCH,f,c}(0)=P_{O\_PRE}+\Delta_{MsgA\_PUSCH}$, where $P_{O\_PRE}$ is provided by preambleReceivedTargetPower and $\Delta_{MsgA\_PUSCH}$ is provided by msgADeltaPreamble, or $\Delta_{MsgA\_PUSCH} = \Delta_{PREAMBLE\_Msg3}$ dB if msgADeltaPreamble is not provided, for carrier f of serving cell c.)

For Formula (2), if common PUSCH transmission (for example, PUSCH transmission other than four-step random access and two-step random access) is performed, j= $\{2, \ldots, J-1\} = S_j$, where $P_{O\_NOMINAL\_PUSCH,f,c}(j)$ may be specified by a higher-layer parameter nominal p0 (that is, the parameter p0-NominalWithGrant in the foregoing configuration information). If not configured, $P_{O\_NOMINAL\_PUSCH,f,c}(j) = P_{O\_NOMINAL\_PUSCH,f,c}(0)$. The parameter $P_{O\_UE\_PUSCH,b,f,c}(j)$ is obtained, based on the field p0-PUSCH-AlphaSetId, from a p0 and alpha set P0-PUSCH-AlphaSet configured by the base station. (For $j \in \{2, \ldots, J-1\} = S_j$, a $P_{O\_NOMINAL\_PUSCH,f,c}(j)$ value, applicable for all $j \in S_j$, is provided by p0-NominalWithGrant, or $P_{O\_NOMINAL\_PUSCH,f,c}(j) = P_{O\_NOMINAL\_PUSCH,f,c}(0)$ if p0-NominalWithGrant is not provided, for each carrier f of serving cell $c$ and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell $c$.)

Herein, $\alpha_{b,f,c}(j)$ represents a path loss amplification factor. $\alpha_{b,f,c}(j)$ may be indicated by higher-layer signaling msgA-Alpha, msg3-Alpha, alpha, or the like (for example, the foregoing configuration information or RRC signaling), or may be 1 by default.

Herein, $M_{RB,b,f,c}^{PUSCH}(i)$ represents a quantity of RBs on a PUSCH, and $2^\mu \times M_{RB,b,f,c}^{PUSCH}(i)$ represents s scheduling bandwidth of the PUSCH. ($M_{RB,b,f,c}^{PUSCH}(i)$ is the bandwidth of the PUSCH resource assignment expressed in number of resource blocks for PUSCH transmission occasion i on active UL BWP b of carrier f of serving cell C and P is a SCS configuration defined in [4, TS 38.211].)

Herein, $PL_{b,f,c}(q_d)$ represents a path loss of an active downlink bandwidth part (active downlink BWP) that is estimated by UE by using a reference signal, and is in a unit of decibels. If the UE is not provided with a reference signal (for example, PUSCH-PathlossReferenceRS or enableDefaultBeamPlForSRS) for PUSCH path loss obtaining, the UE may use a reference signal in a synchronization signal block (SSB) to estimate a path loss, where the SSB is an SSB used by the UE to receive a master information block (MIB). ($PL_{b,f,c}(q_d)$ is a downlink pathloss estimate in dB calculated by the UE using reference signal (RS) index $q_d$ for the active DL BWP, as described in Clause 12, of carrier f of serving cell c. If the UE is not provided PUSCH-PathlossReferenceRS and enableDefaultBeamPl-ForSRS, or before the UE is provided dedicated higher layer parameters, the UE calculates $PL_{b,f,c}(q_d)$ using a RS resource from an SS/PBCH block with same SS/PBCH block index as the one the UE uses to obtain MIB.)

A specific calculation manner is: $PL_{b,f,c}(q_d)$=referenceSignalPower−higher layer filtered RSRP, where referenceSignalPower is transmit power of the reference signal, and higher layer filtered RSRP is receive power of the reference signal.

$\Delta_{TF,f,c}(j)$ satisfies the following formula:

$$\Delta_{TF,f,c}(j) = 10\log_{10}((2^{BPRE \cdot K_s} - 1) \times \beta_{offset}^{PUSCH}) \quad (3)$$

$\Delta_{TF,f,c}(j)$ may represent a transmit power offset. When a higher-layer parameter (for example, deltaMCS in the signaling format shown above) is enabled (that is, deltaMCS is configured), $K_s$=1.25. When a higher-layer parameter is not enabled, $K_s$=0, $\Delta_{TF,f,c}(j)$=0.

The BPRE in Formula (3) may vary with PUSCH transmission content. For example, for uplink data, $BPRE = \sum_{r=0}^{C-1} K_r/N_{RE}$. For channel state information (CSI), $BPRE = Q_m/\beta_{offset}^{PUSCH}$. C is a quantity of sent code blocks (which may also be referred to as code blocks (CB) or the like), and $K_r$ is a size of an $r^{th}$ code block (for example, a size of a code block may be measured by a quantity of bits). $N_{RE}$ is a quantity of resource elements (RE). For example, $N_{RE} = M_{RB,b,f,c}^{PUSCH}(i) \times \sum_{j=0}^{N_{symb,b,f,c}^{PUSCH}(i)-1} N_{sc,data}^{RB}(i, j)$. $Q_m$ represents a modulation order, and $N_{sc,data}^{RB}(i, j)$ is a quantity of subcarriers (or a quantity of resource elements) other than those for a DMRS and a phase tracking reference signal (PTRS) on a PUSCH symbol j in a PUSCH transmission occasion i. If the PUSCH includes uplink data, $\beta_{offset}^{PUSCH} = 1$. If the PUSCH includes only CSI, $\beta_{offset}^{PUSCH} = \beta_{offset}^{CSI,1}$, where $\beta_{offset}^{CSI,1}$ is a power offset corresponding to the CSI. $N_{symb,b,f,c}^{PUSCH}(i)$ represents a quantity of OFDM symbols in the PUSCH transmission occasion i.

$$\left(BPRE = \sum_{r=0}^{C-1} K_r/N_{RE}\right.$$

for PUSCH with UL-SCH data and $BPRE = Q_m \cdot R/\beta_{offset}^{PUSCH}$ for CSI transmission in a PUSCH without UL-SCH data, where C is a number of transmitted code blocks, $K_r$ is a size for code block r, and $N_{RE}$ is a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j),$$

where $N_{symb,b,f,c}^{PUSCH}(i)$ is a number of symbols for PUSCH transmission occasion i on active UL BWP b of carrier f of serving cell $c$, $N_{sc,data}^{RB}(i, j)$ is a number of subcarriers excluding DM-RS subcarriers and phase-tracking RS samples [4, TS 38.211] in PUSCH symbol j and assuming no segmentation for a nominal repetition in case the PUSCH transmission is with repetition Type B, $0 \leq j < N_{symb,b,f,c}^{PUSCH}(i)$, and C, $K_r$ are defined in [5, TS 38.212]

$\beta_{offset}^{PUSCH} = 1$ when the PUSCH includes UL-SCH data and $\beta_{offset}^{PUSCH} = \beta_{offset}^{CSI,1}$, as described in Clause 9.3, when the PUSCH includes CSI and does not include UL-SCH data $Q_m$ is the modulation order and R is the target code rate, as described in [6, TS 38.214], provided by the DCI format scheduling the PUSCH transmission that includes CSI and does not include UL-SCH data.)

Herein, $f_{b,f,c}(i, 1)$ represents accumulated transmit power control (TPC) power corresponding to a PUSCH power control state, and $f_{b,f,c}(i, 1)$ satisfies the following formula:

$$f_{b,f,c}(i, l) = f_{b,f,c}(i-i_0, l) + \sum_{m=0}^{C(D_i)-1} \delta_{PUSCH,b,f,c}(m, l) \quad (4)$$

Herein, $C(D_i)$ represents an accumulated power adjustment received by the UE between the following two time points: a time point that is $K_{PUSCH}(i-i_0)$ OFDM symbols earlier than a PUSCH transmission occasion i−$i_0$, and a time point that is $K_{PUSCH}(i)$ OFDM symbols earlier than a PUSCH transmission occasion i. $K_{PUSCH}(i)$ represents a quantity of OFDM symbols between a last OFDM symbol (that is, a last receiving time) for receiving an uplink grant (corresponding to a PDCCH or DCI) and a previous OFDM symbol (that is, an earliest sending time) of PUSCH transmission. When $\alpha_{b,f,c}(j)$ or $P_{O\_PUSCH,b,f,c}(i)$ is reconfigured, the value may be reset to 0, that is, $f_{b,f,c}(i, l)=0$.

$$\left(f_{b,f,c}(i, l) = f_{b,f,c}(i - i_0, l) + \sum_{m=0}^{C(D_i)-1} \delta_{PUSCH,b,f,c}(m, l)\right.$$

is the PUSCH power control adjustment state l for active UL BWP b of carrier f of serving cell $c$ and PUSCH transmission occasion i if the UE is not provided tpc-Accumulation, where The $\delta_{PUSCH,b,f,c}$ values are given in Table 7.1.1-1

$$\sum_{m=0}^{C(D_i)-1} \delta_{PUSCH,b,f,c}(m, l)$$

is a sum of TPC command values in a set $D_i$ of TPC command values with cardinality $c$ $(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell $c$ for PUSCH power control adjustment state l, where $i_0 > 0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i.)

It may be understood that descriptions of the foregoing formulas or parameters are merely examples. For parts that are not described in detail, refer to a related standard or protocol, such as [8-1, TS 38.101-1], [8-2, TS38.101-2], [8-3, TS38.101-3], [11, TS 38.321], [5, TS 38.212], [4, TS 38.211], [7, TS 38.215], [12, TS 38.331], and [6, TS 38.214]. Details are not described herein again.

Generally, information such as a time domain resource or a frequency domain resource of uplink data may be determined by using downlink control information (DCI). The time domain resource of the uplink data may be in one slot. For example, the time domain resource of the uplink data may be indicated by using a start OFDM symbol (that is, a start position of the time domain resource) and duration (which may also be referred to as a time length or the like). As shown in FIG. 3, a time domain resource shown in a gray part may be an OFDM symbol 2 to an OFDM symbol 10 (which may also be referred to as an OFDM symbol index 2 to an OFDM symbol index 10), that is, the time domain resource includes a total of nine OFDM symbols. For example, a scheduled time or frequency resource in a slot is referred to as a transmission occasion (as specified in a related standard or protocol, one PUSCH transmission occasion does not cross a plurality of slots, that is, one PUSCH transmission instance is not allowed to cross the slot boundary at least for grant-based PUSCH).

Generally, after an uplink transport block (TB) is coded, a plurality of versions (that is, redundancy versions) may be formed. One redundancy version may be sent by using one PUSCH transmission occasion. In addition, a base station may further indicate UE to separately send a plurality of redundancy versions on a plurality of different transmission occasions.

However, when a TB is transmitted in a plurality of slots, how a terminal device performs power control is a problem. If only the formula described above is applied to a scenario in which a TB is transmitted in a plurality of slots, uplink transmit power does not match the plurality of slots. Consequently, receiving by a base station may fail, other UE may be affected, or the like.

In view of this, embodiments of this application provide a transmit power determining method and an apparatus. Transmit power is associated with a slot quantity or an OFDM symbol quantity, so that a terminal device can appropriately control transmit power according to the method, to ensure that uplink transmit power is controlled to be within an appropriate range. In this way, a receiving failure of a base station is improved, or interference to other UE may be further reduced. In addition, as described above, a single redundancy version obtained through channel coding on an uplink transport block is usually sent by using one slot. However, the method provided in this application is applicable to simultaneously sending, by using a plurality of slots, a single redundancy version obtained through channel coding on an uplink transport block.

FIG. 4 is a schematic flowchart of a transmit power determining method according to an embodiment of this application. As shown in FIG. 4, the method includes the following steps.

401: A terminal device determines first transmit power based on N time domain resources corresponding to a first transport block, where the first transmit power is transmit power of the first transport block on each of the time domain resources, a size of the N time domain resources is greater than one slot, and N is a positive integer.

That the size of the N time domain resources is greater than one slot may also be understood as follows: A length occupied by the N time domain resources is greater than one slot; a length occupied by the N time domain resources is greater than T OFDM symbols, where T is not less than 14, or T is greater than or equal to 2 (for example, the N time domain resources occupy two slots, and each slot occupies one OFDM symbol, that is, the N time domain resources include two OFDM symbols, and the two OFDM symbols are distributed in different slots); the N time domain resources are distributed in at least two slots; or a quantity of slots occupied by the N time domain resources is greater than 1. The N time domain resources may be consecutive or inconsecutive.

For example, the N time domain resources may be used to carry a transport block (that is, used to map a transport block). In other words, the N time domain resources include a time domain resource used to transmit the first transport block. Optionally, the N time domain resources may further include a time domain resource occupied by a corresponding demodulation reference signal (DMRS), and the demodulation reference signal is associated with a physical data channel corresponding to the first transport block. In other words, a PUSCH shown below in this embodiment of this application may be used to carry a signal corresponding to the first transport block. The signal corresponding to the first transport block includes the first transport block, or may include a reference signal such as a DMRS or a sounding reference signal (SRS).

The N time domain resources may be understood as follows.

In a first case, the N time domain resources are consecutive, and a length of the N time domain resources is greater than one slot.

For example, if a unit of a time domain resource is slot, it may be understood that the N time domain resources include N slots, where N is an integer greater than 1. For example, the N time domain resources include two slots, three slots, four slots, or the like. In this case, the first transmit power may be understood as transmit power of the first transport block in each slot.

Figure 5A:
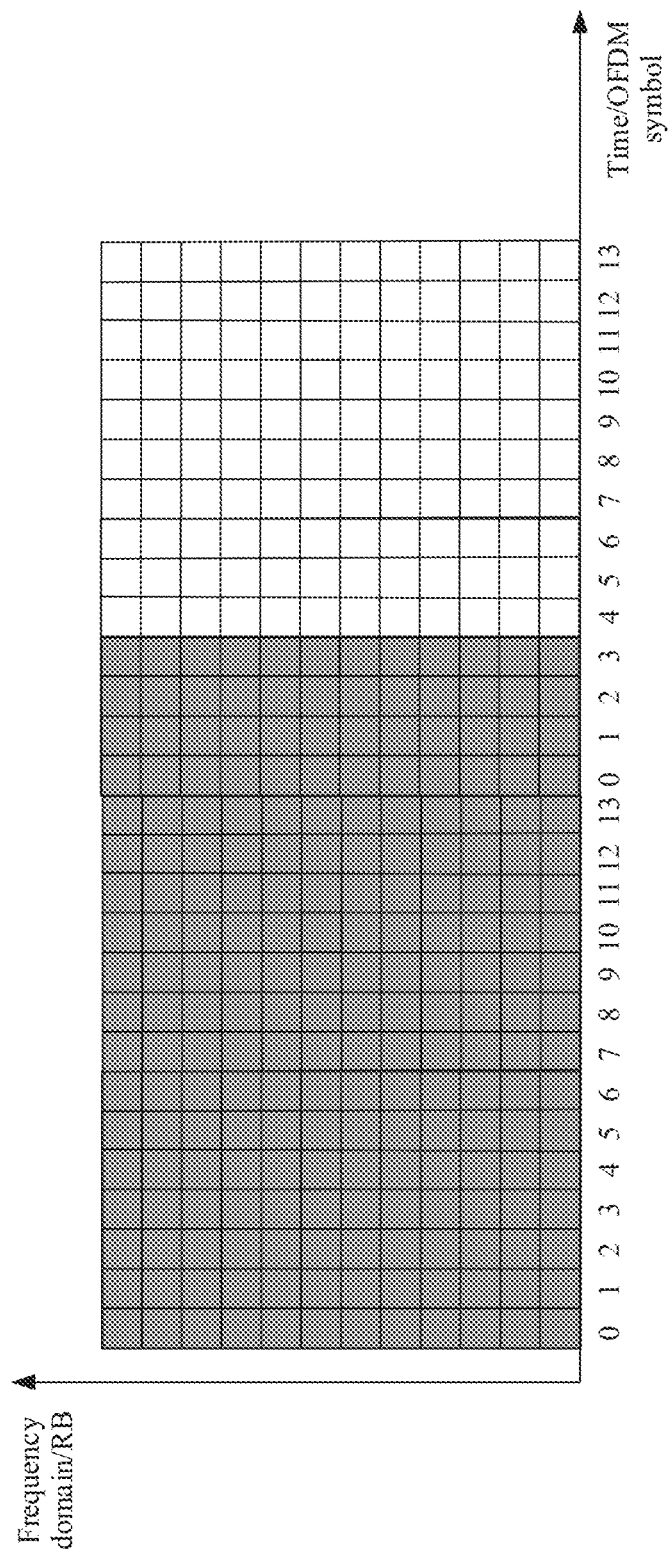
FIG. 5a to FIG. 5d are schematic diagrams of N time domain resources according to an embodiment of this application.

For example, if a unit of a time domain resource is OFDM symbol, the N time domain resources may include K OFDM symbols. For example, K is an integer not less than 14. For example, K=14, K=18, K=20, or K=29. Details are not enumerated herein. For example, as shown in FIG. 5a, the N time domain resources may include 18 OFDM symbols. Because one slot includes 14 OFDM symbols (an OFDM symbol index 0 to an OFDM symbol index 13), the 18 OFDM symbols are greater than one slot. In this case, the time domain resources shown in FIG. 5a may be understood as two time domain resources, and the first transmit power may be understood as transmit power of the first transport block on each time domain resource. For example, the time domain resources shown in FIG. 5a may alternatively be understood as one consecutive time domain resource. Therefore, in this case, the first transmit power may alternatively be understood as transmit power of the first transport block on the one time domain resource. It may be understood that a value relationship between N and K is not limited in this embodiment of this application. For example, if the N time domain resources are measured by slots, for example, N slots, N is less than K. For another example, if the N time domain resources are measured by OFDM symbols, for example, N OFDM symbols, N is equal to K. It may be understood that the unit of the time domain resource herein is merely an example. With technology evolution, the time domain resource may further have another measurement unit or the like. This is not limited in this embodiment of this application.

In a second case, the N time domain resources are inconsecutive, and a length occupied by the N time domain resources is greater than one slot.

Figure 5B:
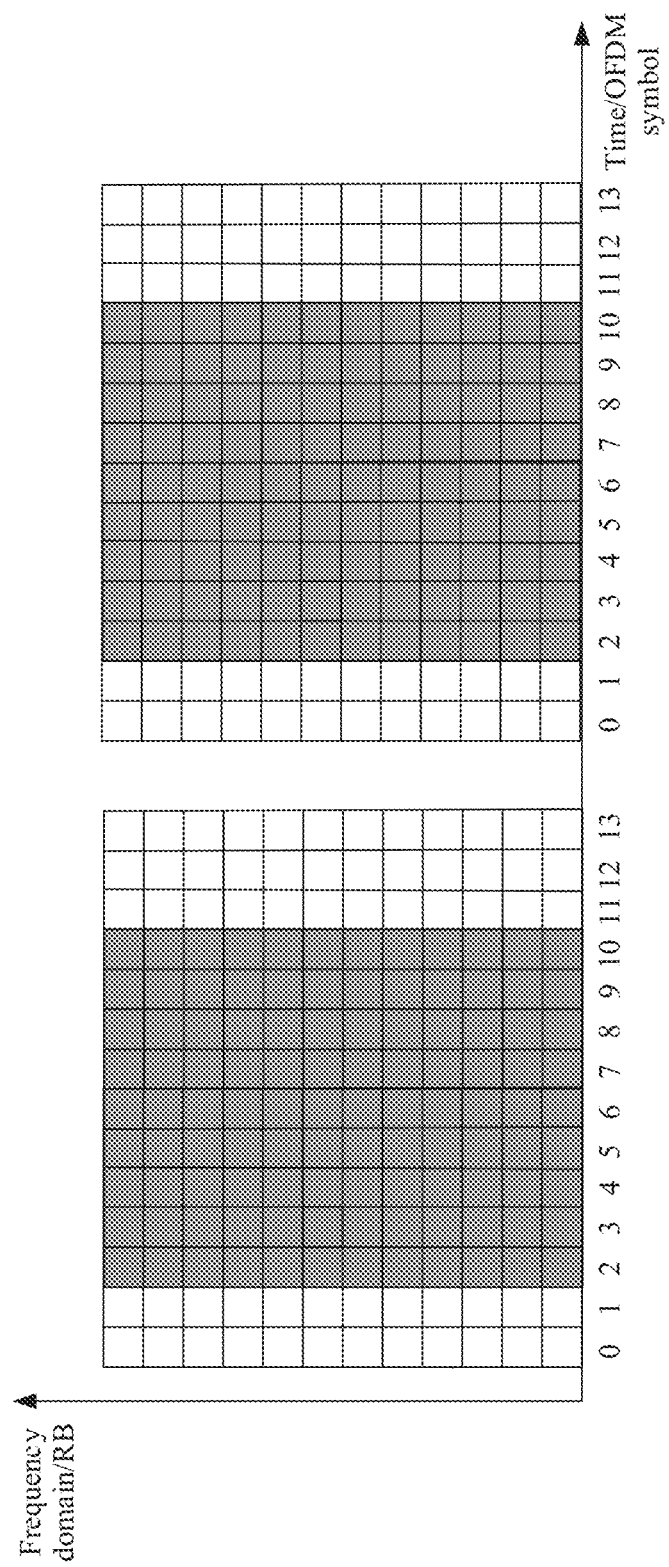
Figure 5C:
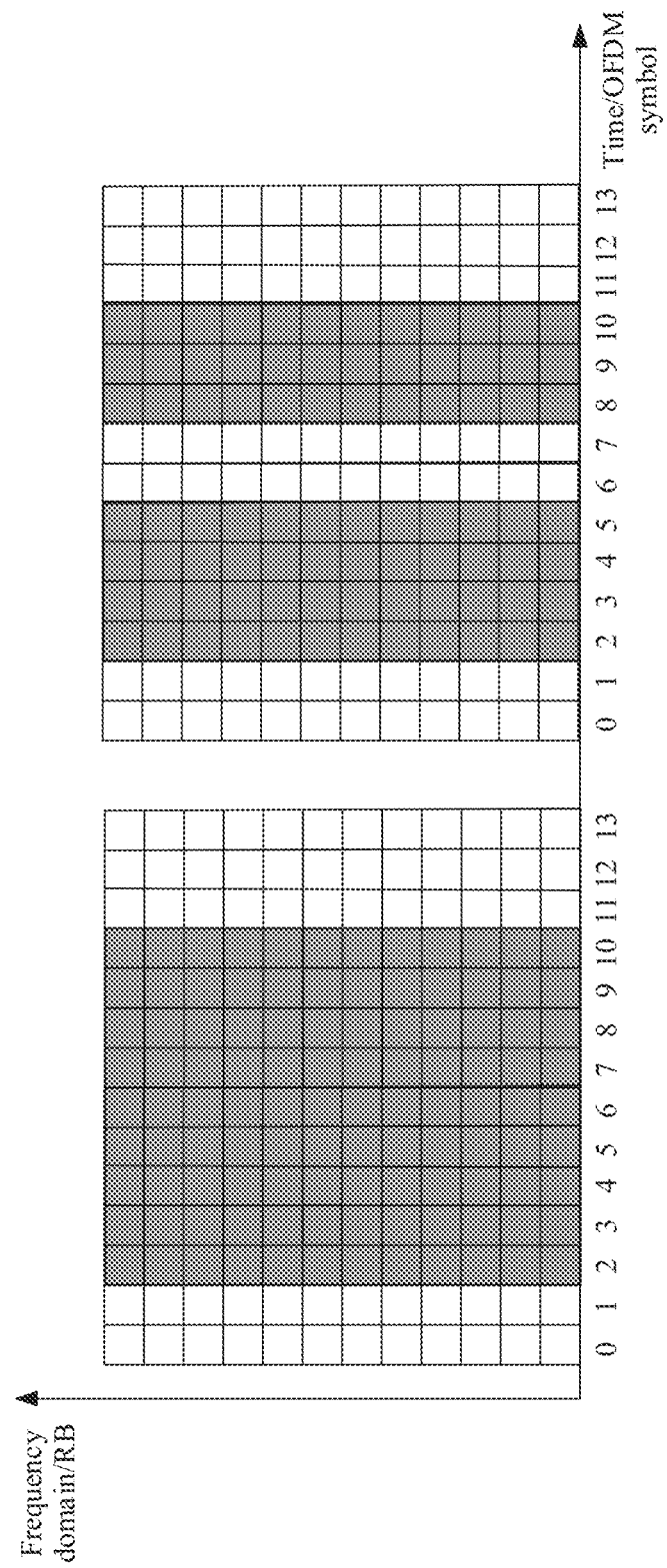

Optionally, the length occupied by the N time domain resources may be understood as follows: A total length of OFDM symbols occupied by the N time domain resources is greater than one slot. In other words, a total length of OFDM symbols occupied by all of the N time domain resources is greater than one slot. For example, as shown in FIG. 5b, although a length of each time domain resource is not greater than one slot, a total length of OFDM symbols occupied by two time domain resources shown in FIG. 5b is 18 OFDM symbols, and is greater than one slot. For example, as shown in FIG. 5c, although lengths of three time domain resources are successively nine OFDM symbols, four OFDM symbols, and three OFDM symbols, and are all less than one slot, a total length of OFDM symbols occupied by the three time domain resources is 16 OFDM symbols, and is greater than one slot. In this case, the first transmit power may be understood as transmit power of the first transport block on each time domain resource. For example, because FIG. 5c shows three inconsecutive time domain resources, the first transmit power may be transmit power on each of the three time domain resources. For example, because the time domain resources shown in FIG. 5c are distributed in two slots, the first transmit power may alternatively be understood as transmit power on each of the two time domain resources (for example, each slot).

Figure 5D:
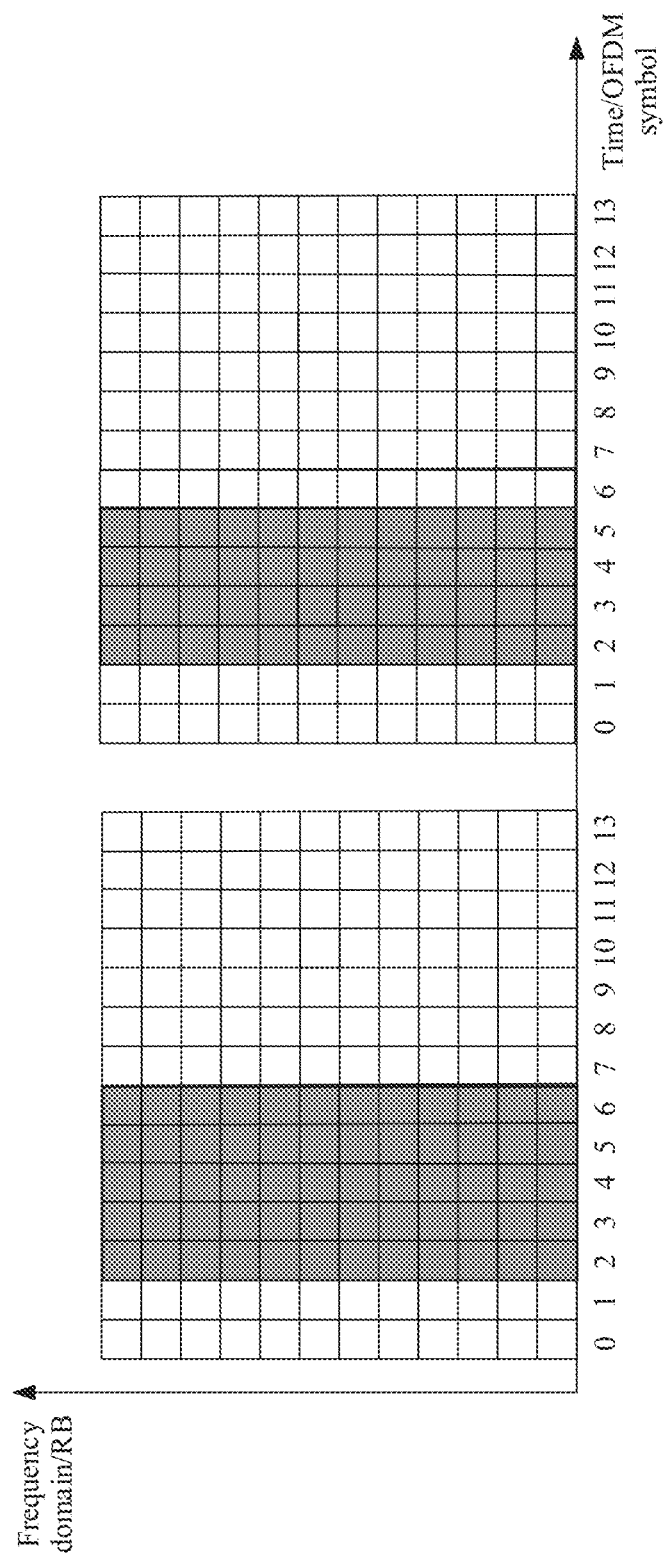

Optionally, the length occupied by the N time domain resources may be understood as follows: A quantity of slots occupied by the N time domain resources is greater than 1. For example, as shown in FIG. 5d, lengths of two shown time domain resources are successively five OFDM symbols and four OFDM symbols, and a total length of OFDM symbols occupied by the two time domain resources is less than one slot. However, the two time domain resources are distributed in two slots. Therefore, it may also be understood that a quantity of slots occupied by the two time domain resources is greater than 1.

It may be understood that, regardless of FIG. 5a to FIG. 5c or FIG. 5d, it may be understood that the N time domain resources are distributed in more than one slot. It can be learned from FIG. 5a to FIG. 5c that the N time domain resources are obviously distributed in two slots, that is, more than one slot. It may be understood that the N time domain resources may be measured by slots, or may be measured by OFDM symbols, or the like. A unit of the N time domain resources is not limited in this embodiment of this application.

In this embodiment of this application, the first transmit power is related to N, and may be related to at least one of the following.

The first transmit power may be related to a frequency domain resource corresponding to the first transport block, for example, a quantity of RBs or a quantity of REs used to transmit the first transport block (or may be understood as a quantity of RBs or a quantity of REs of a PUSCH). For example, the frequency domain resource may be used to determine a transmit power offset. For another example, the frequency domain resource may be used to determine a scheduling bandwidth of the PUSCH.

The first transmit power may be related to a modulation order (for example, $Q_m$) of the first transport block. For example, the modulation order may be used to determine a transmit power offset (for example, BPRE).

The first transmit power may be related to a target coding rate of the first transport block, for example, an MCS (for example, deltaMCS) of the first transport block. For example, the target coding rate may be used to determine a transmit power offset (for example, $K_s$).

The first transmit power may be related to a size of the first transport block, for example, a size of a code block included in the first transport block. For example, the size of the first transport block may be used to determine a transmit power offset (for example, BPRE).

In other words, the first transmit power may be determined based on N, and may be determined based on one or more of the foregoing.

Transmit power of the first transport block satisfies the following formula:

$$P=\min\{P_{CMAX}, P_O + 10 \log_{10}(y(M)) + \alpha \times PL + \Delta + F + \delta(N)\} \text{ [dBm]} \quad (5)$$

Herein, P represents the first transmit power, $P_{CMAX}$ represents maximum transmit power of the first transport block, $P_O$ represents target power of the first transport block, y(M) represents a function of a bandwidth M of the first transport block (in other words, y(M) is determined based on the bandwidth of the first transport block, or y(M) is related to the bandwidth of the first transport block), α represents a path loss amplification factor, PL represents a path loss estimate, Δ represents an offset of the transmit power of the first transport block, and F represents an accumulated power adjustment value of the transmit power of the first transport block.

Optionally, any one or more of $P_O$, y(M), α×PL, Δ, or F is/are determined by N, and δ(N) is equal to 0. Optionally, any one or more of $P_O$, y(M), α×PL, Δ, or F is/are determined by N, and δ(N) is a function of N, or δ(N) is obtained based on configuration information and a relationship between a configuration value and a value of δ. Optionally, δ(N) is a function of N, or δ(N) is obtained based on configuration information and a relationship between a configuration value and a value of δ. In other words, when any one or more of $P_O$, y(M), α×PL, Δ, or F is/are determined by N, δ(N) is equal to 0. Alternatively, δ(N) is not equal to 0. For example, δ(N) is a function of N, or δ(N) is obtained based on configuration information and a relationship between a configuration value and a value of δ, and $P_O$, y(M), α×PL, Δ, or F may not be determined by N. Alternatively, δ(N) is a function of N, and any one or more of $P_O$, y(M), α×PL, Δ, or F is/are determined by N.

δ(N) may be understood as an offset of the first transmit power. It may be understood that for related descriptions that δ(N) is a function of N, refer to the following Formula (8), Formula (9), and the like. Details are not described herein. For example, the relationship between a configuration value and a value of δ(N) may further be shown in Table 2 or Table 3. N shown in Table 2 may be obtained from the configuration information. For example, if a value corresponding to N in the configuration information is n1, corresponding δ(N) may be δ(n1). For example, δ(n1) may be equal to any one of 3, 4, or 5, or δ(n1) may be an interval value, for example, a value between 3 and 5. A value relationship between N and δ(N) is not limited in this embodiment of this application. Table 3 may indicate that when N is a specific value, corresponding δ(N) is a specific value, for example, δ1 or δ2. It may be understood that n1 and n2 shown herein are merely examples. For example, when the N time domain resources include 14 OFDM symbols, 20 OFDM symbols, or 28 OFDM symbols (or the N time domain resources include more than or equal to 14 OFDM symbols and less than or equal to 28 OFDM symbols), a value corresponding to N may correspond to n1. For another example, when the N time domain resources include 29 OFDM symbols, 35 OFDM symbols, or 42 OFDM symbols (or the N time domain resources include more than or equal to 29 OFDM symbols and less than or equal to 42 OFDM symbols), a value corresponding to N may correspond to n2. For example, n1 or n2 may be obtained from corresponding information in the configuration information (for example, when 1 bit is used for indication, n1 may be equal to 0, and n2 may be equal to 1; for another example, when 2 bits are used for indication, n1 may be equal to 00, and n2 may be equal to 01). It may be understood that the descriptions of δ(N), δ(n1), or δ(n2) are also applicable below.

TABLE 2

| Value corresponding to N | Value of δ(N) |
|---|---|
| n1 | δ(n1) |
| n2 | δ(n2) |

TABLE 3

| Value corresponding to N | Value of δ(N) |
|---|---|
| n1 | δ1 |
| n2 | δ2 |

For example, because the first transport block may be sent by using a PUSCH, Formula (5) satisfies the following formula:

$$P_{PUSCH,b,f,c}(i, j, q_d, l) = \min\{P_{CMAX,f,c}(i), P_{O\_PUSCH,b,f,c}(j) + 10 \log_{10}(y(M)) + \alpha_{b,f,c}(j) \times PL_{b,f,c}(q_d) + \Delta_{TF,f,c}(j) + f_{b,f,c}(i, l) + \delta(N)\} \text{ [dBm]} \quad (6)$$

Herein, b represents an index of an active uplink bandwidth part (active uplink bandwidth part), f represents an index of a carrier, c represents an index of a serving cell, j represents an index of a parameter set configuration, l represents an index of a PUSCH power control adjustment state, i represents an index of a PUSCH transmission occasion, and μ represents an index of a subcarrier spacing. It may be understood that for descriptions of the indices of the parameters, refer to the foregoing descriptions of Formula (1) or Formula (5), or refer to a related standard or protocol. Details are not described herein again.

In addition, for descriptions of other parameters in Formula (6), refer to the following.

For example, when δ(N)=0, Formula (6) may satisfy the following formula:

$$P_{PUSCH,b,f,c}(i, j, q_d, l) = \min\{P_{CMAX,f,c}(i), P_{O\_PUSCH,b,f,c}(j) + 10 \log_{10}(y(M)) + \alpha_{b,f,c}(j) \times PL_{b,f,c}(q_d) + \Delta_{TF,f,c}(j) + f_{b,f,c}(i, l)\} \text{ [dBm]} \quad (7)$$

For example, when δ(N) is a function of N, δ(N) may satisfy the following formula:

$$\delta(N) = 10 \log_{10}(N) \quad (8)$$

Alternatively, δ(N) may satisfy the following formula:

$$\delta(N) = -\text{round}(10 \log_{10}(N)) \quad (9)$$

It may be understood that the foregoing Formula (8) and Formula (9) are merely examples. For example, round( ) may represent rounding off, or may be replaced with another function, for example, rounding up or rounding down. Alternatively, δ(N) may be determined based on table lookup. A specific representation method of δ(N) is not limited in this embodiment of this application.

It may be understood that δ(N) shown above may be understood as a power adjustment amount. In other words, the terminal device may determine the power adjustment amount by using N, to determine the first transmit power based on the power adjustment amount.

It may be understood that for a specific method for determining the first transmit power, refer to the following.

402: The terminal device sends the first transport block on the N time domain resources at the first transmit power.

Generally, one transport block (TB) may include a plurality of code block groups (CBG), and one CBG may include a plurality of code blocks (CB). Therefore, sending the first transport block in this embodiment of this application may be further understood as sending a plurality of code blocks obtained based on the first transport block. The plurality of code blocks are obtained through channel coding on the first transport block. Therefore, that the terminal device sends the first transport block on the N time domain resources at the first transmit power may be understood as: sending the plurality of code blocks on the N time domain resources at the first transmit power. Alternatively, sending the first transport block on the N time domain resources may be understood as follows: One or more code blocks (for example, a code block) obtained through channel coding on the first transport block are sent by using OFDM symbols distributed on the N time domain resources.

The N time domain resources corresponding to the first transport block shown above may be understood as N time domain resources used to transmit (or send) the first transport block, or the first transport block is mapped to the N time domain resources.

It may be understood that, with reference to the method provided in this embodiment of this application, the first transport block may be mapped to a plurality of time domain resources (namely, the N time domain resources) in the following several manners.

1. The size of the first transport block is determined based on a quantity of slots to which the first transport block is mapped.
2. When a time domain resource to which the first transport block is mapped is determined (that is, the N time domain resources are determined), the time domain resource is located in a plurality of different slots.
3. A quantity of uplink OFDM symbols indicated in an uplink grant is greater than a predefined value, for example, greater than 12, or greater than 14. A specific value of the predefined value is not limited in this embodiment of this application.
4. A start OFDM symbol position S of a time domain resource (that is, the N time domain resources) in a slot and a quantity L of consecutive OFDM symbols that are indicated in an uplink grant satisfy: S+L>X, where X is an integer (the starting symbol S relative to the start of the slot, and the number of consecutive symbols L counting from the symbol S allocated for the PUSCH). For example, X is greater than a predefined value. For example, X>14. For another example, X>20.

It may be understood that the slot shown in this embodiment of this application may be determined based on a subcarrier spacing used during uplink transmission, or the slot is determined based on a subcarrier spacing on which a downlink control channel or a downlink data channel for sending an uplink grant is based.

In this embodiment of this application, the OFDM symbols included in the N time domain resources may jointly form one transmission occasion. Alternatively, each of the N time domain resources may form one transmission occasion, so that the N time domain resources may form N transmission occasions.

It may be understood that the foregoing describes the transmit power determining method by using the first transport block as an example. However, the first transport block may alternatively be sent by using a PUSCH. Therefore, the transmit power determining method may alternatively be described by using the PUSCH as an example. Therefore, step 401 may be replaced with: determining first transmit power based on N time domain resources corresponding to the PUSCH, where the first transmit power is transmit power on each of the time domain resources, a size of the N time domain resources is greater than one slot, and N is a positive integer. Step 402 may be further replaced with: sending the PUSCH on the N time domain resources at the first transmit power. The PUSCH may be used to carry the first transport block.

In this embodiment of this application, the first transmit power is associated with the N time domain resources corresponding to the transport block, so that a terminal device can determine the first transmit power based on the N time domain resources. This ensures that the first transmit power is controlled to be within an appropriate range, and ensures that the terminal device can appropriately control transmit power. In this way, a case in which a network device fails to receive the transport block is improved, or interference to another terminal device may be reduced.

The following describes in detail a method for determining the first transmit power.

In some embodiments of this application, y(M) may be related to N (that is, determined by N), and the first transmit power satisfies the following formula:

$$P_{PUSCH,b,f,c}(i, j, q_d, l) = \min\{P_{CMAX,f,c}(i), P_{O\_PUSCH,b,f,c}(j)+10\log_{10}(2^\mu \times M_{RB,b,f,c}^{PUSCH}(i)/N)+\alpha_{b,f,c}(j) \times PL_{b,f,c}(q_d)+\Delta_{TF,f,c}(j)+f_{b,f,c}(i, l)\} \text{ [dBm]} \quad (10)$$

In other words, y(M) in Formula (6) may satisfy the following formula:

$$y(M) = 2^\mu \times M_{RB,b,f,c}^{PUSCH}(i)/N \quad (11)$$

It may be understood that, for descriptions of the parameters in Formula (10) and Formula (11), refer to the foregoing embodiments, for example, refer to the descriptions of Formula (6), or refer to the descriptions of Formula (1), or refer to descriptions of the parameters in a related standard or protocol. Details are not described herein again.

For example, $\Delta_{TF,f,c}(j)$ in Formula (10) may be that described in Formula (3). For example, $\Delta_{TF,f,c}(j)=10\log_{10}((2^{BPRE \cdot K_s}-1) \times \beta_{offset}^{PUSCH})$. When a higher-layer parameter (such as deltaMCS) is enabled, $K_s=1.25$. When a higher-layer parameter is not enabled, $K_s=0$, $\Delta_{TF,f,c}(j)=0$. It may be understood that, when $\Delta_{TF,f,c}(j)=0$, for a change of Formula (10), refer to the following Formula (13).

For example, for uplink data, $BPRE=\Sigma_{r=0}^{C-1} K_r/N_{RE}$; and for CSI, $BPRE=Q_m/\beta_{offset}^{PUSCH}$. Herein, C is a quantity of sent code blocks, $K_r$ is a size (a quantity of bits) of an $r^{th}$ code block, $N_{RE}=M_{RB,b,f,c}^{PUSCH}(i) \times \Sigma_{j=0}^{N_{symb,b,f,c}^{PUSCH}(i)-1} N_{sc,data}^{RB}(i, j)$, $Q_m$ represents a modulation order, and $N_{sc,data}^{RB}(i, j)$ is a quantity of subcarriers (or resource elements) other than those for a DMRS and a phase tracking reference signal (PTRS) on a PUSCH symbol j in a PUSCH transmission occasion i. For example, $\beta_{offset}^{PUSCH}$ may also vary with content sent on the PUSCH. For example, if the PUSCH includes uplink data, $\beta_{offset}^{PUSCH}=1$. If the PUSCH includes only CSI, $\beta_{offset}^{PUSCH}=\beta_{offset}^{CSI,1}$, where $\beta_{offset}^{CSI,1}$ is a power offset corresponding to the CSI. Details are not described herein. $N_{symb,b,f,c}^{PUSCH}(i)$ represents a quantity of OFDM symbols in the PUSCH transmission occasion i.

In this embodiment of this application, $M_{RB,b,f,c}^{PUSCH}(i)$ represents a quantity of RBs on a PUSCH, and $2^\mu \times M_{RB,b,f,c}^{PUSCH}(i)$ represents s scheduling bandwidth of the PUSCH. However, in this embodiment of this application, a quantity $M_{RB,b,f,c}^{PUSCH}(i)$ of frequency domain resource blocks scheduled by an uplink PUSCH may be a fraction, that is, corresponding to scheduling based on a resource element (or subcarrier) level. For example, $M_{RB,b,f,c}^{PUSCH}(i)=1/2$. For example, $M_{RB,b,f,c}^{PUSCH}(i)=1/4$. For example, $M_{RB,b,f,c}^{PUSCH}(i)=1/6$. For example, $M_{RB,b,f,c}^{PUSCH}(i)=1/3$. It may be understood that $M_{RB,b,f,c}^{PUSCH}(i)$ may be a fraction less than 1, or may be a fraction greater than 1. For example, $M_{RB,b,f,c}^{PUSCH}(i)=4/3$.

In this embodiment of this application, because the PUSCH is sent by using the N time domain resources, and $2^\mu \times M_{RB,b,f,c}^{PUSCH}(i)$ may represent the scheduling bandwidth of the PUSCH, a scheduling bandwidth of the PUSCH on each time domain resource may be represented by using Formula (11). Therefore, even if the PUSCH is sent by using a time domain resource greater than one slot, the terminal device may determine the first transmit power based on the time domain resource, so that the terminal device can appropriately control the transmit power.

In some other embodiments of this application, the first transmit power satisfies the following formula:

$$P_{PUSCH,b,f,c}(i, j, q_d, l) = \min\{P_{CMAX,f,c}(i), P_{O\_PUSCH,b,f,c}(j)+10\log_{10}(2^\mu \times M_{RB,b,f,c}^{PUSCH}(i))+\alpha_{b,f,c}(j) \times PL_{b,f,c}(q_d)+\Delta_{TF,f,c}(j)+f_{b,f,c}(i, l)+\delta(N)\} \text{ [dBm]} \quad (12)$$

For descriptions of δ(N), refer to the descriptions of Formula (8) or Formula (9). Details are not described herein again.

It may be understood that, for Formula (10), when a higher-layer parameter (for example, deltaMCS) is not configured, or when $K_s=0$, the first transmit power may further satisfy the following formula:

$$P_{PUSCH,b,f,c}(i, j, q_d,l) = \min\{P_{CMAX,f,c}(i), P_{O\_PUSCH,b,f,c}(j) + 10\log_{10}(2^\mu \times M_{RB,b,f,c}^{PUSCH}(i)/N) + \alpha_{b,f,c}(j) \times PL_{b,f,c}(q_d) + f_{b,f,c}(i, l)\} \text{ [dBm]} \quad (13)$$

For Formula (12), when a higher-layer parameter (for example, deltaMCS) is not configured, or when $K_s=0$, the first transmit power may further satisfy the following formula:

$$P_{PUSCH,b,f,c}(i, j, q_d,l) = \min\{P_{CMAX,f,c}(i), P_{O\_PUSCH,b,f,c}(j) + 10\log_{10}(2^\mu \times M_{RB,b,f,c}^{PUSCH}(i)) + \alpha_{b,f,c}(j) \times PL_{b,f,c}(q_d) + f_{b,f,c}(i, l) + \delta(N)\} \text{ [dBm]} \quad (14)$$

It may be understood that, for descriptions of Formula (13) and Formula (14), refer to Formula (10), Formula (12), Formula (1), or the like. Details are not described herein again.

In some other embodiments of this application, when a transmit power offset is not 0, that is, when a higher-layer parameter (for example, deltaMCS) is configured, $\Delta_{TF,f,c}(j)$ may be related to N (that is, determined by N), and the first transmit power satisfies the following formula:

$$P_{PUSCH,b,f,c}(i, j, q_d,l) = \min\{P_{CMAX,f,c}(i), P_{O\_PUSCH,b,f,c}(j) + 10\log_{10}(2^\mu \times M_{RB,b,f,c}^{PUSCH}(i)) + \alpha_{b,f,c}(j) \times PL_{b,f,c}(q_d) + \Delta_{TF,f,c}(j) + f_{b,f,c}(i, l)\} \text{ [dBm]} \quad (15)$$

Herein, $\Delta_{TF,f,c}(j) = 10\log_{10}((2^{BPRE \times K_s}-1) \times \beta_{offset}^{PUSCH})$.

For example, for uplink data, $BPRE = \Sigma_{r=0}^{C-1} K_r / N_{RE}$; and for CSI, $BPRE = Q_m / \beta_{offset}^{PUSCH}$. Herein, C is a quantity of sent code blocks, $K_r$ is a size of an $r^{th}$ code block, $N_{RE}$ is a quantity of REs, and $Q_m$ represents a modulation order. If the PUSCH includes uplink data, $\beta_{offset}^{PUSCH} = 1$. If the PUSCH includes only CSI, $\beta_{offset}^{PUSCH} = \beta_{offset}^{CSI,1}$, where $\beta_{offset}^{CSI,1}$ is a power offset corresponding to the CSI.

Optionally, $N_{RE}$ may satisfy the following formula:

$$N_{RE} = M_{RB,b,f,c}^{PUSCH}(i) \times \Sigma_{s=0}^{N-1} \Sigma_{j=0}^{N_{symb,b,f,c}^{PUSCH}-1} N_{sc,data}^{RB}(i, j, s) \quad (16)$$

Herein, $N_{symb,b,f,c}^{PUSCH}(i, s)$ may represent a quantity of OFDM symbols of a PUSCH transmission occasion i in a slot s, and $N_{sc,data}^{RB}(i, j, s)$ is a quantity of subcarriers (or a quantity of resource elements) other than those for a reference signal (or a reserved subcarrier) on a PUSCH symbol j of the PUSCH transmission occasion i in the slot s. The reference signal may include a DMRS or a phase tracking reference signal (PTRS). The slot s is included in the N time domain resources. For descriptions of the N time domain resources, refer to the foregoing description. Details are not described herein again.

It may be understood that, because $N_{symb,b,f,c}^{PUSCH}(i, s)$ represents the quantity of OFDM symbols of the PUSCH transmission occasion i in the slot s, transmit power (that is, the first transmit power) in each slot in N frequency domain resources may be calculated according to Formula (16).

Optionally, $N_{RE}$ may satisfy the following formula:

$$N_{RE} = M_{RB,b,f,c}^{PUSCH}(i) \times N \times \Sigma_{j=0}^{N_{symb,b,f,c}^{PUSCH}(i)-1} N_{sc,data}^{RB}(i, j) \quad (17)$$

Herein, $N_{symb,b,f,c}^{PUSCH}(i)$ represents a quantity of OFDM symbols of a PUSCH transmission occasion i in each slot in the N time domain resources, and $N_{sc,data}^{RB}(i, j, s)$ is a quantity of subcarriers (or a quantity of resource elements) other than those for a reference signal on a PUSCH symbol j of the PUSCH transmission occasion i in each slot in the N time domain resources. That is, the PUSCH transmission occasion i corresponds to N slots, and quantities of OFDM symbols in all slots are the same.

For Formula (17), $N_{symb,b,f,c}^{PUSCH}(i)$ may represent the quantity of OFDM symbols of the PUSCH transmission occasion i in each slot in the N time domain resources. Therefore, for the N time domain resources, although transmit power on each time domain resource is the first transmit power, that is, the first transmit power may be determined by using Formula (17), transmit power on all time domain resources may be the same or may be different. This is not limited in this embodiment of this application.

In a possible implementation, the quantity C of code blocks obtained through channel coding and/or the size $K_r$ of each code block may also be determined based on N. A method for determining the quantity of code blocks and the size of the code block based on N may be shown in FIG. 6c below, and details are not described herein.

In some other embodiments of this application, $P_{O\_PUSCH,b,f,c}(j)$ may be related to N, and the first transmit power satisfies the following formula:

$$P_{PUSCH,b,f,c}(i, j, q_d,l) = \min\{P_{CMAX,f,c}(i), P_{O\_PUSCH,b,f,c}(j) + 10\log_{10}(2^\mu \times M_{RB,b,f,c}^{PUSCH}(i)) + \alpha_{b,f,c}(j) \times PL_{b,f,c}(q_d) + \Delta_{TF,f,c}(j) + f_{b,f,c}(i, l)\} \text{ [dBm]} \quad (18)$$

With reference to Formula (2), $P_{O\_PUSCH,b,f,c}(j) = P_{O\_NOMINAL\_PUSCH,f,c}(j) + P_{O\_UE\_PUSCH,b,f,c}(j)$, where $j \in \{0, 1, \ldots, J-1\}$.

In a possible implementation, $P_{O\_NOMINAL\_PUSCH,f,c}(j)$ may be specified by a higher-layer parameter. For example, $P_{O\_NOMINAL\_PUSCH,f,c}(j)$ may be corresponding nominal p0 when the first transport block is mapped to the N time domain resources. For example, a new field p0-NominalTBOverMultiSlot may be added to the higher-layer parameter to indicate nominal p0. To be specific, a base station may send configuration information to UE, the configuration information may include the field p0-NominalTBOverMultiSlot, the field may be used to indicate nominal p0, and nominal p0 may be used to determine $P_{O\_NOMINAL\_PUSCH,f,c}(j)$.

In another possible implementation, $P_{O\_NOMINAL\_PUSCH,f,c}(j)$ may be related to N. For example, nominal p0 for determining $P_{O\_NOMINAL\_PUSCH,f,c}(j)$ may be related to N. For example, a relationship between $P_{O\_NOMINAL\_PUSCH,f,c}(j)$ and N may be shown in Table 4 or Table 5.

TABLE 4

| Value corresponding to N | $P_{O\_NOMINAL\_PUSCH, f, c}(j)$ (dB) or nominal p0 value |
|---|---|
| n1 | p0-NominalWithGrant + $\delta$(n1) |
| n2 | p0-NominalWithGrant + $\delta$(n2) |

It may be understood that for descriptions of p0-NominalWithGrant, refer to the foregoing description. Details are not described herein again. For example, the parameter p0-NominalWithGrant may be included in the configuration information, and the parameter p0-NominalWithGrant may be used to indicate the nominal p0 value.

TABLE 5

| Value corresponding to N | $P_{O\_NOMINAL\_PUSCH, f, c}(j)$ (dB) or nominal p0 value |
|---|---|
| n1 | p0-NominalTBOverMultiSlot + $\delta$(n1) |
| n2 | p0-NominalTBOverMultiSlot + $\delta$(n2) |

For example, n1 may be 1 or the like, and n2 may be 2, 4, 8, or the like. $\delta$(n) represents a function of n. For example, $\delta$(n)=10 $\log_{10}$(n). For example, $\delta$(n)=−round(10 $\log_{10}$(n)). For example, values of n1 and n2 may further correspond to indication information. For example, when 1 bit is used for indication, n1 may correspond to 0, and n2 may correspond to 1. For another example, when 2 bits are used for indication, n1 may correspond to 00, and n2 may correspond to 01. In this case, δ(n1) and δ(n2) are offsets. It may be understood that, in Table 4 or Table 5, two values of N are used as examples. In practice, there may be more values. This is not limited in this embodiment of this application. It may be understood that, for related descriptions of δ(n1) and δ(n2), refer to the implementations shown above. Details are not described herein again.

Herein, round( ) represents rounding off, and may be replaced with another function, for example, rounding up or rounding down. Alternatively, δ(N) may be determined based on table (for example, Table 2 or Table 3) lookup. A specific representation method of δ(N) is not limited in this embodiment of this application. It may be understood that values of n1 and n2 are not limited in this embodiment of this application. In addition, N in Table 4 or Table 5 may alternatively have more values. This is not limited in this embodiment of this application either.

In a possible implementation, $P_{O\_UE\_PUSCH,b,f,c}(j)$ may be specified by a higher-layer parameter. For example, the higher-layer parameter may include one or more of a field p0-PUSCH-AlphaSetId, a field p0-PUSCH-AlphaSet, or a field P0-PUSCH-AlphaSetMultiSlot. For example, p0-PUSCH-AlphaSet may indicate a transmission mode of the first transport block. For example, the UE may determine, based on the field p0-PUSCH-AlphaSetId, whether the field p0-PUSCH-AlphaSet is used to map the first transport block to the N time domain resources (for example, N slots or K OFDM symbols). For example, when p0-PUSCH-AlphaSetId is less than or equal to a predefined value (for example, the predefined value is 30; for another example, the predefined value is 20), p0-PUSCH-AlphaSet may be used for a transmission mode in which the first transport block is mapped to a single slot (that is, consecutive time domain resources are less than or equal to one slot). When p0-PUSCH-AlphaSetId is greater than a predefined value, p0-PUSCH-AlphaSet may be used for a transmission mode in which the first transport block is mapped to the N time domain resources.

For example, a signaling format of the field P0-PUSCH-AlphaSetMultiSlot may be shown as follows:

```
P0-PUSCH-AlphaSetMultiSlot    SEQUENCE {
P0-PUSCH-AlphaSetId, n    ENUMERATED {sl1, sl2, sl4,
sl8, sl10, sl20}
OPTIONAL,
p0    INTEGER (-16..15)
alpha                         OPTIONAL
}
```

P0-PUSCH-AlphaSetMultiSlot represents a possible set of p0 and alpha values corresponding to the PUSCH, and p0-PUSCH-AlphaSetId represents an index of the set of p0 and alpha values corresponding to the PUSCH. N represents a quantity of slots to which one transport block is mapped in the PUSCH, sl1 indicates that a quantity of slots to which one transport block is mapped is 1, sl2 indicates that a quantity of slots to which one transport block is mapped is 2 (for example, it may be understood that the transport block is distributed in two slots), sl4 indicates that a quantity of slots to which one transport block is mapped is 4 (for example, it may be understood that the transport block is distributed in four slots), and by analogy, sl20 indicates that a quantity of slots to which one transport block is mapped is 20. p0 indicates the p0 value corresponding to the PUSCH, and alpha indicates the alpha value corresponding to the PUSCH. It may be understood that, for descriptions of the parameters, refer to the foregoing signaling format and the like.

Optionally, one or more parameters configured by using p0-PUSCH-AlphaSet may also be related to N, and a relationship is shown in Table 6 and Table 7.

TABLE 6

| Value corresponding to N | $P_{O\_UE\_PUSCH, b, f, c}(j)$ (dB) or p0 value |
|---|---|
| n1 | p0 + δ(n1) |
| n2 | p0 + δ(n2) |

TABLE 7

| Value corresponding to N | alpha value |
|---|---|
| n1 | alpha × a(n1) |
| n2 | alpha × a(n2) |

For descriptions of δ(n) in Table 6, refer to the foregoing descriptions. Details are not described herein again. α(n) may represent a function about n. For example, α(n)=1/(n+1).

Optionally, p0-PUSCH-AlphaSetId may be further specifically used in a scenario in which the first transport block is mapped to a plurality of time domain resources. Alternatively, the foregoing parameter may have another name, for example, p0-MultiSlotPUSCH-AlphaSetId. It may be understood that, in Table 6 or Table 7, two values of N are used as examples. In practice, there may be more values. This is not limited in this embodiment of this application.

In some other embodiments of this application, accumulated transmit power control power may be related to N, and the first transmit power satisfies the following formula:

$$P_{PUSCH,b,f,c}(i, j, q_d, l) = \min\{P_{CMAX,f,c}(i), P_{O\_PUSCH,b,f,c}(j) + 10\log_{10}(2^\mu \times M_{RB,b,f,c}^{PUSCH}(i)) + \alpha_{b,f,c}(j) \times PL_{b,f,c}(q_d) + \Delta_{TF,f,c}(j) + f_{b,f,c}(i, l)\}$$
[dBm]    (19)

For example, an accumulated power adjustment value satisfies the following formula:

$$f_{b,f,c}(i, l) = f_{b,f,c}(i-i_0) + \sum_{m=0}^{C(D_i)-1} \delta_{PUSCH,b,f,c}(m,l) \quad (20)$$

Herein, $C(D_i)$ represents an accumulated power adjustment received by the UE between the following two time points: a time point that is $K_{PUSCH}(i-i_0)$ OFDM symbols earlier than a PUSCH transmission occasion $i-i_0$, and a time point that is $K_{PUSCH}(i)$ OFDM symbols earlier than a PUSCH transmission occasion i. $K_{PUSCH}(i)$ represents a quantity of OFDM symbols between a last OFDM symbol (that is, a last receiving time) for receiving an uplink grant (corresponding to a PDCCH or DCI) and a previous OFDM symbol (that is, an earliest sending time) of PUSCH transmission. When $\alpha_{b,f,c}(j)$ or $P_{O\_PUSCH,b,f,c}(j)$ is reconfigured, the value is reset to 0, that is, $f_{b,f,c}(i, l)=0$.

Optionally, for example, a quantity of slots to which the first transport block is mapped in a PUSCH transmission occasion i is N(i), a quantity of slots to which the first transport block is mapped in a PUSCH transmission occasion $i-i_0$ is $N(i-i_0)$, and the first transmit power may be related to N(i) and $N(i-i_0)$. For example, when N(i) is not equal to $N(i-i_0)$, $f_{b,f,c}(i, l)=0$. For another example, when a difference $N(i)-N(i-i_0)$ between N(i) and $N(i-i_0)$ exceeds a threshold T (for example, $|N(i)-N(i-i_0)|>T$), $f_{b,f,c}(i, l)=\delta(N(i))$, $f_{b,f,c}(i, l)=\delta(|N(i)-N(i-i_0)|)$, or $f_{b,f,c}(i, l)=\delta(T)$. For example, $i_0=1$. It may be understood that T shown herein may be defined by a related standard or protocol, or may be configured by the base station. This is not limited in this embodiment of this application. For example, T may be an integer or the like. According to the method in this embodiment of this application, when different quantities of time domain resources are used to transmit signals at different times, uplink transmit power control is more accurate, power efficiency of the terminal is improved, and interference to another user is reduced.

Optionally, the power adjustment value $\delta_{PUSCH,b,f,c}(m,l)$ may also be related to $N(i)$ and/or $N(i-i_0)$. For example, as shown in Table 8 and Table 9, N is $N(i)$ or $N(i-i_0)$.

TABLE 8

| Value of a power adjustment command field (TPC command field) | Accumulated power adjustment value (accumulated $\delta_{PUSCH, b, f, c}$ [dB]) | Absolute power adjustment value (absolute $\delta_{PUSCH, b, f, c}$ [dB]) |
|---|---|---|
| 0 | $-1 + 10 \log_{10}(N)$ | $-4 + 10 \log_{10}(N)$ |
| 1 | $0 + 10 \log_{10}(N)$ | $-1 + 10 \log_{10}(N)$ |
| 2 | $1 + 10 \log_{10}(N)$ | $1 + 10 \log_{10}(N)$ |
| 3 | $3 + 10 \log_{10}(N)$ | $4 + 10 \log_{10}(N)$ |

TABLE 9

| Value of a power adjustment command field (TPC command field) | Accumulated power adjustment value (accumulated $\delta_{PUSCH, b, f, c}$ [dB]) | Absolute power adjustment value (absolute $\delta_{PUSCH, b, f, c}$ [dB]) |
|---|---|---|
| 0 | $-1 - 10 \log_{10}(N)$ | $-4 - 10 \log_{10}(N)$ |
| 1 | $0 - 10 \log_{10}(N)$ | $-1 - 10 \log_{10}(N)$ |
| 2 | $1 - 10 \log_{10}(N)$ | $1 - 10 \log_{10}(N)$ |
| 3 | $3 - 10 \log_{10}(N)$ | $4 - 10 \log_{10}(N)$ |

It may be understood that in Table 8 or Table 9, two values of the power adjustment command field are used as examples. In practice, there may be more values. This is not limited in this embodiment of this application.

It may be understood that, in the foregoing embodiments, for a part that is not described in detail in one embodiment, refer to another embodiment. The foregoing embodiments may alternatively be combined with each other. For example, Formula (10) shows that the bandwidth of the first transport block is related to N, and Formula (15) shows that the transmit power offset is related to N. In this embodiment of this application, the first transmit power may alternatively be determined with reference to Formula (10) and Formula (15). In other words, in the first transmit power, the bandwidth of the first transport block is related to N, and the transmit power offset may be related to N. For another example, Formula (18) shows that $P_{O\_PUSCH,b,f,c}(j)$ is related to N. Therefore, the first transmit power may alternatively be determined with reference to Formula (10) and Formula (18). Alternatively, the first transmit power may be determined with reference to Formula (15) and Formula (18), or the first transmit power may be determined with reference to Formula (10), Formula (15), and Formula (18). Details are not described herein again.

Figure 6A:
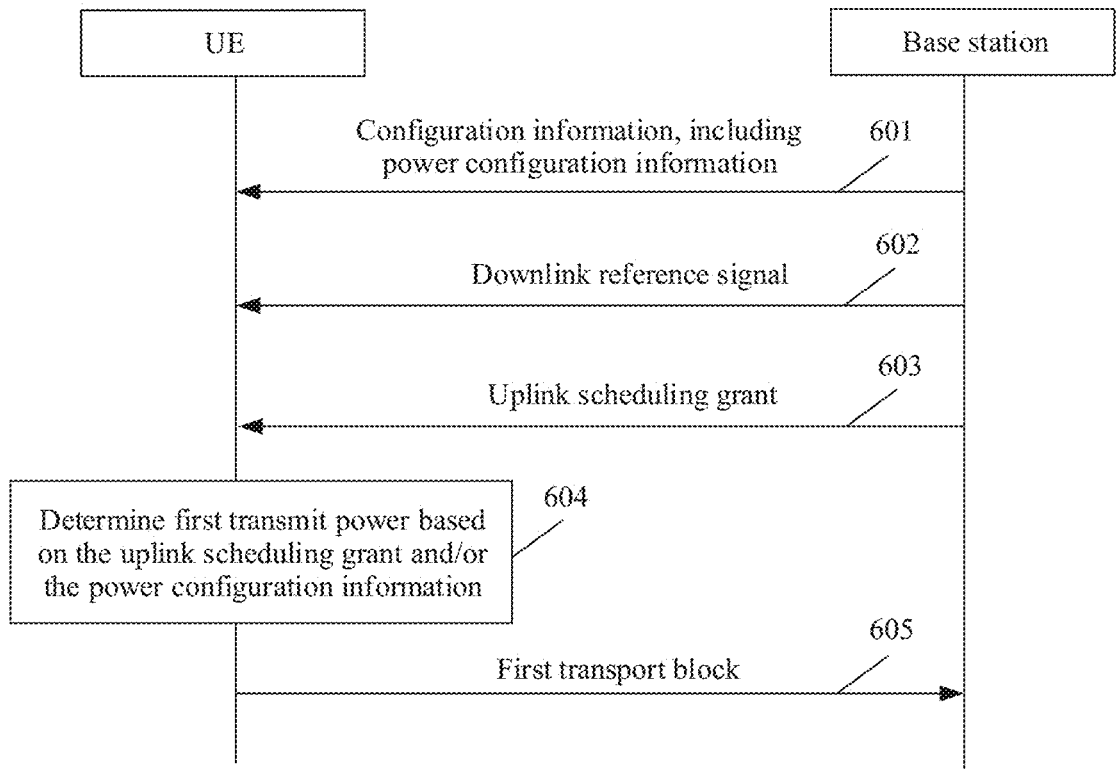
FIG. 6a is a schematic flowchart of a transmit power determining method according to an embodiment of this application.

To understand the transmit power determining method according to embodiments of this application in more detail, FIG. 6a is a schematic flowchart of another transmit power determining method according to an embodiment of this application. As shown in FIG. 6a, the method includes the following steps.

601: A base station sends configuration information to UE. Correspondingly, the UE receives the configuration information.

For example, the configuration information includes power configuration information, and the power configuration information may be used in a scenario in which a first transport block is mapped to a plurality of slots. For example, a field p0-NominalTBOverMultiSlot in RRC may be used for indication. For example, when the UE determines that the first transport block is mapped to a plurality of slots, the UE may determine first transmit power by using a nominal p0 value indicated by the field p0-NominalTBOverMultiSlot. For descriptions of a field included in the configuration information, refer to the foregoing embodiments. Details are not described herein again.

602: The base station sends a downlink reference signal to the UE, where the downlink reference signal is used to determine a path loss corresponding to a PUSCH. Correspondingly, the UE receives the downlink reference signal.

603: The base station sends an uplink grant (UL grant) to the UE. Correspondingly, the UE receives the uplink grant. The uplink grant may be indicated by using any one or more of the following: a physical downlink control channel (PDCCH), a media access control-control element (MAC-CE), or radio resource control (RRC) signaling.

For example, the UE may determine, based on the uplink grant, a parameter for mapping the first transport block to the plurality of slots. For example, the UE may determine a quantity N of slots to which the first transport block is mapped, a start OFDM symbol S for mapping, and a quantity L of OFDM symbols for continuous mapping. For example, a parameter configured in the uplink grant may be included in the configuration information.

604: The UE determines first transmit power based on the uplink grant and/or the power configuration information.

For example, the UE may determine the first transmit power based on one or more of N, S, L, or S+L. For a specific method for determining the first transmit power, refer to the following. Details are not described herein again.

605: The UE sends the first transport block at the first transmit power.

Figure 6B:
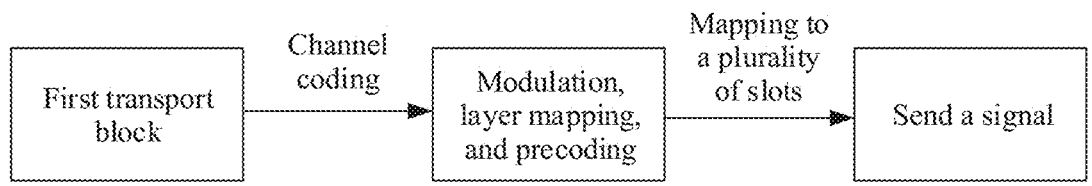
FIG. 6b is a schematic flowchart of transport block processing according to an embodiment of this application.

For example, processing of the transport block may be shown in FIG. 6b. For example, after obtaining the first transport block, the UE may perform processing such as modulation, layer mapping, or precoding on the first transport block, to obtain a modulation symbol corresponding to the first transport block. In addition, the modulation symbol corresponding to the first transport block is mapped to N time domain resources, and the modulation symbol corresponding to the first transport block is sent by using the N time domain resources.

Figure 6C:
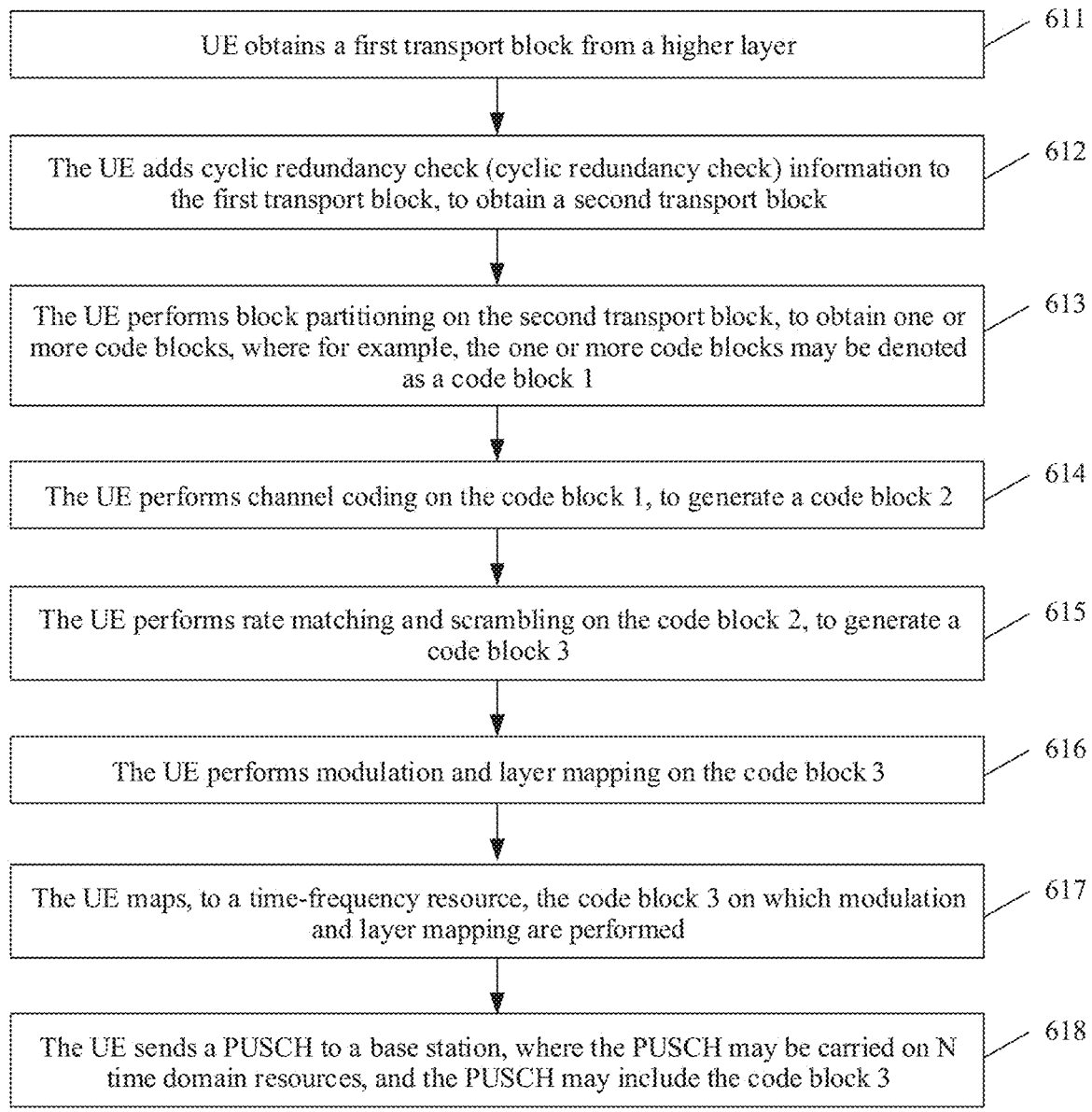
FIG. 6c is a schematic flowchart of a first transport block processing method according to an embodiment of this application.

With reference to the foregoing method, an embodiment of this application further provides a transport block processing method. As shown in FIG. 6c, the method includes the following steps.

611: UE obtains a first transport block from a higher layer (for example, a higher layer of the UE).

For example, the first transport block may be a media access control (MAC) protocol Data unit (PDU). A size (TBS) of the first transport block is determined based on at least one piece of the following information: a time domain resource (for example, N time domain resources provided in embodiments of this application), a frequency domain resource, an MCS, and a quantity of transport layers (and/or a quantity of ports) (for example, denoted as $N_L$) that are indicated in DCI. The MCS may be index information. For example, the MCS may be used to indicate information such as a modulation order $Q_m$, a target coding rate R, and spectral efficiency.

For example, the UE may further determine the size of the first transport block by using step a to step e shown below. Specific descriptions are provided below.

Step a: The UE determines an unquantized intermediate variable $N_{info}$, where $N_{info}=N_L \times R \times Q_m \times N_{RE}$.

Herein, $N_L$ is a quantity of mapping layers of the first transport block, $N_{RE}$ is a quantity of resource elements (RE) to which the first transport block is mapped, R is a target coding rate, and $Q_m$ is a modulation order. Optionally, for descriptions of $N_{RE}$, refer to the foregoing embodiments. Alternatively, $N_{RE}$ may be determined according to the following implementation.

For example, when quantities of OFDM symbols (or OFDM symbol positions)(that is, N time domain resources are the same, and quantities and positions of OFDM symbols included in all slots corresponding to the N time domain resources are the same) and quantities of frequency domain resource blocks (or resource block positions) in all slots are the same, $N'_{RE,k}$ may be determined in the following manner. $N'_{RE,k}$ may be understood as a quantity of REs allocated to a PUSCH in a PRB (an index is denoted as k). For example, when configurations in all slots (for example, quantities and positions of OFDM symbols occupied in all slots) are completely the same, $N'_{RE,k}=N\times(N_{SC}^{RB}\times N_{symb,k}^{sh}-N_{DMRS,k}^{PRB}-N_{oh,k}^{PRB})$. A value of $N_{SC}^{RB}$ is a fixed value, and may represent a quantity of subcarriers included in one PRB in frequency domain. For example, $N_{SC}^{RB}=12$. $N_{symb,k}^{sh}$ represents a quantity of scheduled OFDM symbols of a $k^{th}$ RB (which may be at a granularity of RB or may be at a granularity of RBG) in one slot. $N_{oh,k}^{PRB}$ represents a quantity of overheads of the $k^{th}$ RB (or RBG) in one slot, for example, a quantity of overheads used for CSI-RS transmission. For another example, when overheads and DMRS configurations of resource blocks in all slots are completely the same, $N'_{RE}=N\times(N_{SC}^{RB}\times N_{symb}^{sh}-N_{DMRS}^{PRB}-N_{oh}^{PRB})$. A value of $N_{SC}^{RB}$ is a fixed value. For example, $N_{SC}^{RB}=12$. $N_{symb}^{sh}$ represents a quantity of scheduled OFDM symbols of each RB (or RBG) in one slot. $N_{oh}^{PRB}$ represents a quantity of overheads of each RB (or RBG) in one slot, for example, a quantity of overheads used for CSI-RS transmission.

For example, when quantities of OFDM symbols (or OFDM symbol positions) and quantities of frequency domain resource blocks (or resource block positions) in all slots are not completely the same, $N'_{RE,k}$ may be determined in the following manner. $N'_{RE,k}$ may be understood as a quantity $N'_{RE,k}$ of REs allocated to a PUSCH in a PRB (an index is denoted as k). For example, if configurations in all slots are completely the same, $N'_{RE,k}=\Sigma_{s=0}^{N-1}(N_{SC}^{RB}\times N_{symb,k}^{sh}(s)-N_{DMRS,k}^{PRB}(s)-N_{oh,k}^{PRB}(s))$. A value of $N_{SC}^{RB}$ is a fixed value. For example, $N_{SC}^{RB}=12$. $N_{symb,k}^{sh}(s)$ represents a quantity of scheduled OFDM symbols of a $k^{th}$ RB (or RBG) in a slot s. $N_{oh,k}^{PRB}(s)$ represents a quantity of overheads of the $k^{th}$ RB (or RBG) in the slot s, for example, a quantity of overheads used for CSI-RS transmission. For another example, when overheads and DMRS configurations of resource blocks in all slots are completely the same, $N'_{RE}=\Sigma_{s=0}^{N-1}(N_{SC}^{RB}\times N_{symb}^{sh}(s)-N_{DMRS}^{PRB}(s)-N_{oh}^{PRB}(s))$. A value of $N_{SC}^{RB}$ is a fixed value. For example, $N_{SC}^{RB}=12$. $N_{symb}^{sh}(s)$ represents a quantity of scheduled OFDM symbols of each RB (or RBG) in a slot s. $N_{oh}^{PRB}(s)$ represents a quantity of overheads of each RB (or RBG) in the slot s, for example, a quantity of overheads used for CSI-RS transmission.

According to the foregoing method, a quantity of resource elements allocated in the entire PUSCH is $N_{RE}=\Sigma_{k=0}^{n_{PRB}-1}N'_{RE,k}$ or $N_{RE}=n_{PRB}N'_{RE}$.

Step b: The UE determines a quantized intermediate variable $N'_{info}$ based on the intermediate variable $N_{info}$.

It should be noted that when values of $N_{info}$ are different, methods for determining the first TBS by the UE may be different.

In a possible implementation, when $N_{info} \leq 3824$, the UE determines a value of the first TBS according to the following step c and step d (this is denoted as case 1). When $N_{info} > 3824$, the UE determines a value of the first TBS according to the following step e and step f (this is denoted as case 2). The following separately describes in detail case 1 and case 2.

Case 1: $N_{info} \leq 3824$

In case 1, the UE determines the value of the first TBS according to the following step c and step d.

Step c: The UE determines $$N'_{info} = \max\left(24, 2^n \times \left\lfloor \frac{N_{info}}{2^n} \right\rfloor\right).$$

Herein, $n=\max(3, \lfloor \log_2(N_{info}) \rfloor - 6)$.

Step d: The UE may search Table 10 for a maximum value that is not greater than $N'_{info}$, and use the maximum value as the value of the first TBS. For example, if $N'_{info}$ determined according to the foregoing formula is 1200, it can be learned according to Table 10 that a maximum value that is not greater than 1200 is 1192. In this case, the first TBS is 1192 bits (bit). It may be understood that Table 10 is merely an example, and a correspondence between an index and a TBS is not limited in this embodiment of this application.

TABLE 10

| Index | Transport block size (TBS) | Index | TBS | Index | TBS | Index | TBS |
|---|---|---|---|---|---|---|---|
| 1 | 24 | 31 | 336 | 61 | 1288 | 91 | 3624 |
| 2 | 32 | 32 | 352 | 62 | 1320 | 92 | 3752 |
| 3 | 40 | 33 | 368 | 63 | 1352 | 93 | 3824 |
| 4 | 48 | 34 | 384 | 64 | 1416 | | |
| 5 | 56 | 35 | 408 | 65 | 1480 | | |
| 6 | 64 | 36 | 432 | 66 | 1544 | | |
| 7 | 72 | 37 | 456 | 67 | 1608 | | |
| 8 | 80 | 38 | 480 | 68 | 1672 | | |
| 9 | 88 | 39 | 504 | 69 | 1736 | | |
| 10 | 96 | 40 | 528 | 70 | 1800 | | |
| 11 | 104 | 41 | 552 | 71 | 1864 | | |
| 12 | 112 | 42 | 576 | 72 | 1928 | | |
| 13 | 120 | 43 | 608 | 73 | 2024 | | |
| 14 | 128 | 44 | 640 | 74 | 2088 | | |
| 15 | 136 | 45 | 672 | 75 | 2152 | | |
| 16 | 144 | 46 | 704 | 76 | 2216 | | |
| 17 | 152 | 47 | 736 | 77 | 2280 | | |
| 18 | 160 | 48 | 768 | 78 | 2408 | | |
| 19 | 168 | 49 | 808 | 79 | 2472 | | |
| 20 | 176 | 50 | 848 | 80 | 2536 | | |
| 21 | 184 | 51 | 888 | 81 | 2600 | | |
| 22 | 192 | 52 | 928 | 82 | 2664 | | |
| 23 | 208 | 53 | 984 | 83 | 2728 | | |
| 24 | 224 | 54 | 1032 | 84 | 2792 | | |
| 25 | 240 | 55 | 1064 | 35 | 2856 | | |
| 26 | 256 | 56 | 1128 | 86 | 2976 | | |
| 27 | 272 | 57 | 1160 | 87 | 3104 | | |

TABLE 10-continued

| Index | Transport block size (TBS) | Index | TBS | Index | TBS | Index | TBS |
|---|---|---|---|---|---|---|---|
| 28 | 288 | 58 | 1192 | 88 | 3240 | | |
| 29 | 304 | 59 | 1224 | 89 | 3368 | | |
| 30 | 320 | 60 | 1256 | 90 | 3496 | | |

Case 2: $N_{info}>3824$

Step e: The UE determines $$N'_{info} = \max\left(3840, 2^n \times \text{round}\left(\frac{N_{info} - 24}{2^n}\right)\right).$$

Herein, $n = \lfloor \log_2(N_{info}-24) \rfloor - 5)$.

Step f: The UE determines the value of the first TBS based on the target coding rate R and $N'_{info}$. It may be understood that TBS1 shown below represents the size of the first transport block.

In a possible implementation, when $$R \le \frac{1}{4}, TBS1 = 8 \times C \times \left\lfloor \frac{N'_{info} - 24}{8 \times C} \right\rfloor - 24.$$

Herein, $$C = \left\lceil \frac{N'_{info} + 24}{3816} \right\rceil.$$

When $R>\frac{1}{4}$ and $N'_{info}>8424$, $$TBS1 = 8 \times C \times \left\lfloor \frac{N'_{info} - 24}{8 \times C} \right\rfloor - 24.$$

Herein, $$C = \left\lceil \frac{N'_{info} + 24}{3816} \right\rceil.$$

When $R>\frac{1}{4}$ and $N'_{info} \le 8424$, $$TBS1 = 8 \times \left\lfloor \frac{N'_{info} - 24}{8 \times C} \right\rfloor - 24.$$

It may be understood that for descriptions of the foregoing parameters, for a part that is not described in detail in one implementation, refer to another implementation.

612: The UE adds cyclic redundancy check information to the first transport block, to obtain a second transport block.

For example, for a method for adding the CRC information by the UE, refer to a related standard or protocol such as TS 38.212. Details are not described herein again.

613: The UE performs block partitioning on the second transport block, to obtain one or more code blocks. For example, the one or more code blocks may be denoted as a code block 1.

For example, the UE may perform block partitioning on the second transport block by using a physical layer, to obtain C code blocks, where C is a positive integer.

It may be understood that whether the UE adds CRC information to the plurality of code blocks may be determined based on a value of C. For example, when C=1, because the code block is equivalent to the original transport block, the UE does not need to add CRC information to the code block obtained through block partitioning on the second transport block. For another example, when C is greater than 1, the UE may add CRC information to the C code blocks.

614: The UE performs channel coding on the code block 1, to generate a code block 2.

615: The UE performs rate matching on the code block 2 (or the UE may further scramble the code block 2), to generate a code block 3.

In a possible implementation, a size E (referred to as $K_r$ above, where r=0, 1, . . . , C−1) of the code block satisfies the following formula:

$$E = N_L \times Q_m \times \left\lfloor \frac{G1}{N_L \cdot Q_m \cdot C} \right\rfloor \quad (21)$$

In another possible implementation, a size E of the code block satisfies the following formula:

$$E = N_L \times Q_m \times \left\lceil \frac{G1}{N_L \cdot Q_m \cdot C} \right\rceil \quad (22)$$

It may be understood that in this application, $\lceil \cdot \rceil$ represents rounding up, and may be represented by ceil(•). In another implementation, a value of E may be alternatively determined in a round-off manner, for example, round(•). This is not limited in this embodiment of this application.

For example, a total quantity $G_1$ of bits of the first transport block after coding may satisfy the following formula:

$$G_1 = N_L \times Q_m \times N_{RE} \quad (23)$$

It may be understood that, in Formula (21) to Formula (23), the parameters are described as follows: E represents the size of the code block (that is, $K_r$ shown above), $N_L$ represents a quantity of mapping layers of the first transport block, $Q_m$ represents a modulation order of the first transport block, $G_1$ is a total quantity of bits of the first transport block after coding, $N_L$ represents a quantity of transport layers (or a quantity of ports) of the first transport block, C represents a quantity of code blocks corresponding to the first transport block, and $N_{RE}$ represents a quantity of REs to which the first transport block is mapped.

616: The UE performs modulation and layer mapping on the code block 3.

617: The UE maps the code block 3 on which modulation and layer mapping are performed to a time-frequency resource (for example, a time domain resource in the time-frequency resource may be N time domain resources shown in embodiments of this application).

618: The UE sends a PUSCH to a base station, where the PUSCH may be carried on N time domain resources, and the PUSCH may include the code block 3.

It may be understood that quantities of code blocks included in the code block 1, the code block 2, and the code block 3 are not limited in this embodiment of this application. It may be understood that for a channel coding method, a rate matching method, a modulation method, and the like, refer to a related standard or protocol. This is not limited in this embodiment of this application.

In this embodiment of this application, the UE may determine the first transmit power based on the time domain resource, so that the terminal device can appropriately control the transmit power.

It may be understood that, in the foregoing embodiments, for a part that is not described in detail in one embodiment, refer to another embodiment.

The following describes communication apparatuses provided in embodiments of this application.

In this application, the communication apparatus is divided into function modules based on the foregoing method examples. For example, function modules corresponding to functions may be obtained through division, or two or more functions may be integrated into one processing module. The integrated module may be implemented in a form of hardware, or may be implemented in a form of a software function module. It should be noted that division into the modules in this application is an example, and is merely logical function division. In actual implementation, there may be another division manner. The following describes in detail communication apparatuses in embodiments of this application with reference to FIG. 7 to FIG. 9.

Figure 7:
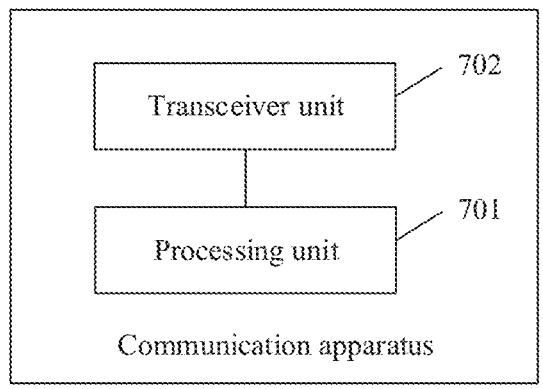
FIG. 7 to FIG. 9 are schematic diagrams of structures of communication apparatuses according to an embodiment of this application.

FIG. 7 is a schematic diagram of a structure of a communication apparatus according to an embodiment of this application. As shown in FIG. 7, the communication apparatus includes a processing unit 701 and a transceiver unit 702. The communication apparatus may be the terminal device shown above, a chip in the terminal device, or the like. That is, the communication apparatus may be configured to perform steps, functions, or the like performed by the terminal device (including UE) in the foregoing method embodiments.

For example, the processing unit 701 is configured to determine first transmit power based on N time domain resources corresponding to a first transport block.

The transceiver unit 702 is configured to output the first transport block on the N time domain resources at the first transmit power.

Alternatively, for example, the processing unit 701 is configured to determine first transmit power based on N time domain resources corresponding to a first signal; and the transceiver unit 702 is configured to send the first signal on the N time domain resources at the first transmit power.

It may be understood that the transceiver unit 702 may perform, by using the processing unit 701, the step of outputting the first transport block or the first signal. For example, after the first transport block or the first signal is processed by the processing unit 701, the transceiver unit 702 may output the first transport block or the first signal processed by the processing unit 701. In this embodiment of this application, a specific step in which the transceiver unit 702 outputs the first transport block or the first signal is not limited.

It may be understood that, for descriptions of the first transmit power, the N time domain resources, the first transport block, the first signal, or the like, refer to the foregoing embodiments. Details are not described herein again.

It may be understood that, for specific descriptions of the transceiver unit and the processing unit that are shown above, refer to the steps performed by the terminal device or the UE in the foregoing method embodiments. For example, the processing unit 701 may be configured to perform step 401 shown in FIG. 4, and the transceiver unit 702 may be configured to perform step 402 shown in FIG. 4. For example, the transceiver unit 702 may be further configured to perform a receiving step in step 601 to step 603 shown in FIG. 6a and a sending step in step 605, and the processing unit 701 may be further configured to perform step 604 shown in FIG. 6a. For example, the processing unit 701 may be further configured to perform step 611 to step 617 shown in FIG. 6c, and the transceiver unit 702 may be further configured to perform step 618 shown in FIG. 6c.

The foregoing describes the terminal device in embodiments of this application, and the following describes a possible product form of the terminal device. It should be understood that any form of product that has a function of the terminal device described in FIG. 7 falls within the protection scope of embodiments of this application. It should be further understood that the following description is merely an example, and a product form of the terminal device in embodiments of this application is not limited thereto.

In a possible implementation, in the communication apparatus shown in FIG. 7, the processing unit 701 may be one or more processors, and the transceiver unit 702 may be a transceiver. Alternatively, the transceiver unit 702 may be a sending unit and a receiving unit, the sending unit may be a transmitter, and the receiving unit may be a receiver. The sending unit and the receiving unit are integrated into one device, for example, a transceiver. In this embodiment of this application, the processor and the transceiver may be coupled, or the like. A connection manner between the processor and the transceiver is not limited in this embodiment of this application.

Figure 8:
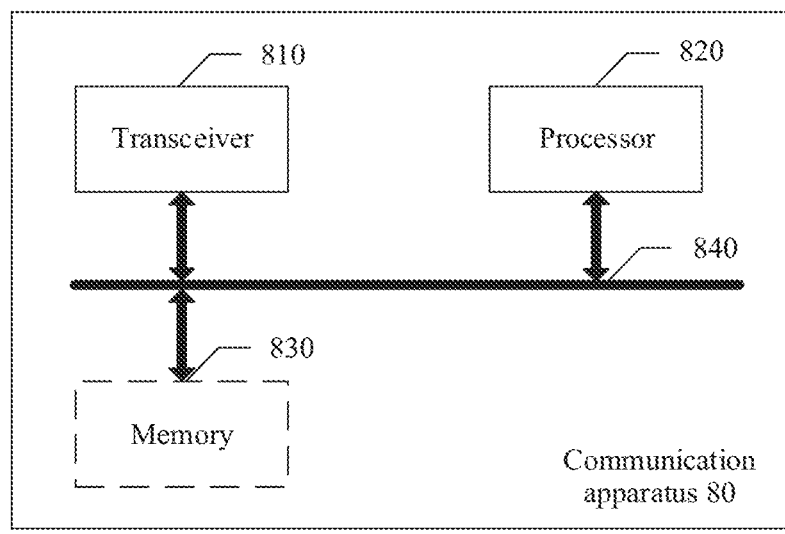

As shown in FIG. 8, a communication apparatus 80 includes one or more processors 820 and a transceiver 810.

In this embodiment of this application, when the communication apparatus 80 is a terminal device (including UE), for a method, a function, an operation, or the like performed by the processor 820, refer to the method, the function, the operation, or the like performed by the processing unit 701 (that is, the communication apparatus shown in FIG. 7 is a terminal device), and for a method, a function, an operation, or the like performed by the transceiver 810, refer to the method, the function, or the operation performed by the transceiver unit 702.

It may be understood that for specific descriptions of the processor and the transceiver, refer to the descriptions of the processing unit and the transceiver unit shown in FIG. 7. Details are not described herein again.

In embodiments of the communication apparatus shown in FIG. 8, the transceiver may include a receiver and a transmitter. The receiver is configured to perform a receiving function (or operation), and the transmitter is configured to perform a transmission function (or operation). The transceiver is configured to communicate with another device/apparatus through a transmission medium.

Optionally, the communication apparatus 80 may further include one or more memories 830, configured to store program instructions and/or data. The memory 830 is coupled to the processor 820. The coupling in this embodiment of this application is an indirect coupling or a communication connection between apparatuses, units, or modules, may be in an electrical form, a mechanical form, or another form, and is used for information exchange between the apparatuses, the units, or the modules. The processor 820 may cooperate with the memory 830. The processor 820 may execute the program instructions stored in the memory

830. Optionally, at least one of the one or more memories may be included in the processor.

In this embodiment of this application, a specific connection medium between the transceiver 810, the processor 820, and the memory 830 is not limited. In this embodiment of this application, the memory 830, the processor 820, and the transceiver 810 are connected by using a bus 840 in FIG. 8. The bus is represented by a bold line in FIG. 8. A connection manner between other components is merely an example for description, and constitutes no limitation. The bus may be classified into an address bus, a data bus, a control bus, or the like. For ease of representation, only one bold line is used for representation in FIG. 8, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In this embodiment of this application, the memory may include but is not limited to a nonvolatile memory, for example, a hard disk drive (HDD) or a solid-state drive (SSD), a random access memory (RAM), an erasable programmable read-only memory (EPROM), a read-only memory (ROM), or a compact disc read-only memory (CD-ROM). The memory is any storage medium that can be used to carry or store program code in a form of an instruction or a data structure and that can be read and/or written by a computer (for example, the communication apparatus shown in this application). However, this is not limited thereto. The memory in embodiments of this application may alternatively be a circuit or any other apparatus that can implement a storage function, and is configured to store program instructions and/or data. In an example, the memory may be configured to store configuration information of a reference signal sequence.

It may be understood that when the communication apparatus shown in FIG. 8 is configured to perform steps or functions performed by the terminal device, the processor 820 is mainly configured to: process a communication protocol and communication data, control the entire communication apparatus, execute a software program, and process data of the software program. The memory 830 is mainly configured to store the software program and data. The transceiver 810 may include a control circuit and an antenna. The control circuit is mainly configured to: perform conversion between a baseband signal and a radio frequency signal, and process the radio frequency signal. The antenna is mainly configured to receive and send radio frequency signals in a form of electromagnetic waves. The input/output apparatus, such as a touchscreen, a display, or a keyboard, is mainly configured to: receive data input by a user and output data to the user.

After the communication apparatus is powered on, the processor 820 may read the software program in the memory 830, explain and execute instructions of the software program, and process data of the software program. When data needs to be sent in a wireless manner, after performing baseband processing on the to-be-sent data, the processor 820 outputs a baseband signal to the radio frequency circuit; and the radio frequency circuit performs radio frequency processing on the baseband signal and then sends the radio frequency signal to the outside in a form of an electromagnetic wave through the antenna. When data is sent to the communication apparatus, the radio frequency circuit receives a radio frequency signal through the antenna, converts the radio frequency signal into a baseband signal, and outputs the baseband signal to the processor 820. The processor 820 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

It may be understood that the communication apparatus shown in this embodiment of this application may further include more components than those in FIG. 8, and the like. This is not limited in this embodiment of this application. The methods performed by the processor and the transceiver are merely examples. For specific steps performed by the processor and the transceiver, refer to the methods described above.

It may be understood that, in the communication apparatus shown in FIG. 8, for descriptions of the first transmit power, the N time domain resources, the first transport block, the first signal, or the like, refer to the foregoing embodiments. Details are not described herein again.

Figure 9:
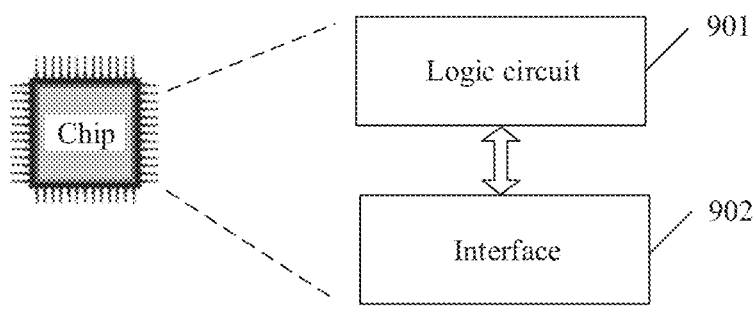

In another possible implementation, in the communication apparatus shown in FIG. 7, the processing unit 701 may be one or more logic circuits, and the transceiver unit 702 may be an input/output interface, which may alternatively be referred to as a communication interface, an interface circuit, an interface, or the like. Alternatively, the transceiver unit 702 may be a sending unit and a receiving unit. The sending unit may be an output interface, and the receiving unit may be an input interface. The sending unit and the receiving unit are integrated into one unit, for example, an input/output interface. As shown in FIG. 9, a communication apparatus shown in FIG. 9 includes a logic circuit 901 and an interface 902. That is, the processing unit 701 may be implemented by using the logic circuit 901, and the transceiver unit 702 may be implemented by using the interface 902. The logic circuit 901 may be a chip, a processing circuit, an integrated circuit, a system on chip (SoC) chip, or the like. The interface 902 may be a communication interface, an input/output interface, or the like. In this embodiment of this application, the logic circuit may further be coupled to the interface. A specific connection manner of the logical circuit and the interface is not limited in this embodiment of this application.

In this embodiment of this application, when the communication apparatus is configured to perform the method, the function, or the step performed by the terminal device, the logic circuit 901 is configured to determine first transmit power based on N time domain resources corresponding to a first transport block; and the interface 902 is configured to output the first transport block. Alternatively, the logic circuit 901 is configured to determine first transmit power based on N time domain resources corresponding to a first signal (for example, a PUSCH); and the interface 902 is configured to output the first signal.

It may be understood that the communication apparatus shown in FIG. 9 may not include a memory; or the communication apparatus shown in FIG. 9 may further include a memory. This embodiment of this application imposes no limitation on whether the communication apparatus shown in FIG. 9 includes a memory.

For a specific implementation of each embodiment shown in FIG. 9, refer to the foregoing embodiments. Details are not described herein again. For example, for descriptions of the logic circuit, refer to the descriptions of the processing unit. For descriptions of the interface, refer to the descriptions of the transceiver unit. Details are not described herein again.

In the foregoing embodiments, for descriptions of the first transmit power, the N time domain resources, the first transport block, the first signal, or the like, refer to the foregoing embodiments. Details are not described herein again.

It may be understood that the communication apparatus shown in embodiments of this application may implement the method provided in embodiments of this application in a form of hardware or in a form of software. This is not limited in embodiments of this application.

This application further provides a computer program, and the computer program is used to implement operations and/or processing performed by a terminal device in the method provided in this application.

This application further provides a computer-readable storage medium. The computer-readable storage medium stores computer code. When the computer code is run on a computer, the computer is enabled to perform operations and/or processing performed by a terminal device in the method provided in this application.

This application further provides a computer program product. The computer program product includes computer code or a computer program. When the computer code or the computer program is run on a computer, operations and/or processing performed by a terminal device in the method provided in this application are/is performed.

In the several embodiments provided in this application, it should be understood that the disclosed system, apparatus, and method may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be connections in an electrical, mechanical, or another form.

The units described as separate parts may or may not be physically separate, and parts displayed as units may or may not be physical units, may be located in one place, or may be distributed on a plurality of network units. Some or all of the units may be selected based on actual requirements to achieve the technical effects of the solutions provided in embodiments in this application.

In addition, function units in embodiments of this application may be integrated into one processing unit, or each unit may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a readable storage medium and includes several instructions for instructing a computer device (which may be a personal computer, a server, or a network device) to perform all or some of the steps of the methods described in embodiments of this application. The readable storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A transmit power determining method, wherein the transmit power determining method comprises:

determining a first transmit power based on N time domain resources corresponding to a first transport block, wherein the first transmit power is a transmit power of the first transport block on each of the N time domain resources, a size of the N time domain resources is greater than one slot, one slot includes 14 orthogonal frequency division multiplexing (OFDM) symbols, and N is a positive integer; and sending the first transport block on the N time domain resources at the first transmit power;

wherein the first transmit power satisfies the following formula:

$$P=\min\{P_{CMAX}, P_O+10\log_{10}(2^\mu \times M_{RB,b,f,c}^{PUSCH}(i))+\alpha \times PL+\Delta+F\} \text{ [dBm], wherein}$$

P represents the first transmit power, $P_{CMAX}$ represents maximum transmit power of the first transport block, $P_O$ represents target power of the first transport block, $\mu$ represents an index of a subcarrier spacing, $M_{RB,b,f,c}^{PUSCH}$ (i) represents a quantity of resource blocks (RBs) on a physical uplink shared channel (PUSCH), $\alpha$ is indicated by msgA-Alpha, msg3-Alpha or alpha, or $\alpha$ is 1, PL represents a path loss estimate, $\Delta$ represents an offset of transmit power of the first transport block, and F represents an accumulated power adjustment value of the transmit power of the first transport block; and one or more of $P_O$, $\alpha \times PL$, $\Delta$, or F is determined by N.

2. The transmit power determining method according to claim 1, wherein the N time domain resources comprise K orthogonal frequency division multiplexing (OFDM) symbols, the K OFDM symbols occupy at least two slots, and K is a positive integer greater than 14; or the N time domain resources comprise N slots, wherein N is an integer greater than 1.

3. The transmit power determining method according to claim 1, wherein the first transmit power is further determined based on at least one piece of the following information: a frequency domain resource corresponding to the first transport block, a modulation order of the first transport block, a target coding rate of the first transport block, or a size of the first transport block.

4. The transmit power determining method according to claim 1, wherein a physical channel corresponding to the first transport block comprises a physical uplink shared channel (PUSCH); and $P_{CMAX}=P_{CMAX,f,c}(i)$, $P_O=P_{O\_PUSCH,b,f,c}(j)$, $\alpha \times PL=\alpha_{b,f,c}(j) \times PL_{b,f,c}(q_d)$, $\Delta=\Delta_{TF,f,c}(j)$, and $F=f_{b,f,c}(i, l)$, wherein f represents an index of a carrier, c represents an index of a serving cell, i represents an index of a transmission occasion, b represents an index of an active uplink bandwidth part, j represents an index of a parameter set configuration, $q_d$ represents an index of a reference signal, and l represents an index of a power control adjustment state.

5. The transmit power determining method according to claim 1, wherein $P_O$ satisfies the following formula:

$P_O=P_{O\_NOMINAL}+P_{O\_UE}$, wherein at least one of $P_{O\_NOMINAL}$ or $P_{O\_UE}$ is determined by a function of N.

6. The transmit power determining method according to claim 5, wherein:

the function of N is $10 \log_{10}(N)$; or
the function of N is $-\text{round}(10 \log_{10}(N))$; or
the function of N is $1/(N+1)$.

7. The transmit power determining method according to claim 1, wherein $\Delta$ satisfies the following formula:

$\Delta = 10 \log_{10}((2^{BPRE \times K_s}-1) \times \beta_{offset})$; and $BPRE = \Sigma_{r=0}^{C-1} K_r/N_{RE}$, wherein C represents a quantity of code blocks corresponding to the first transport block; $K_r$ represents a size of an $r^{th}$ code block; $N_{RE}$ represents a quantity of resource elements (REs) corresponding to the first transport block; $N_{RE}$ is determined by a quantity of OFDM symbols of the first transport block in an $s^{th}$ time domain resource, wherein the $s^{th}$ time domain resource is comprised in the N time domain resources; or $N_{RE}$ is determined by a quantity of OFDM symbols of the first transport block in each of the N time domain resources; $K_s$ is configured by a network device or is defined in a protocol; and $\beta_{offset}$ is an offset.

8. The transmit power determining method according to claim 7, wherein $N_{RE}$ satisfies the following formula:

$N_{RE}=M_{RB,b,f,c}^{PUSCH}(i) \times \Sigma_{s=0}^{N-1} \Sigma_{j=0}^{N_{symb,b,f,c}^{PUSCH}-1} N_{sc,data}^{RB}(i, j, s)$, wherein $N_{symb,b,f,c}^{PUSCH}(i, s)$ represents a quantity of OFDM symbols of a transmission occasion i of a PUSCH in the $s^{th}$ time domain resource, $N_{sc,data}^{RB}(i, j, s)$ represents a quantity of REs other than REs for a reference signal on an OFDM symbol j of the transmission occasion i of the PUSCH in the $s^{th}$ time domain resource, and the $s^{th}$ time domain resource is comprised in the N time domain resources; or $N_{RE}$ satisfies the following formula:

$N_{RE}=M_{RB,b,f,c}^{PUSCH}(i) \times N \times \Sigma_{j=0}^{N_{symb,b,f,c}^{PUSCH}-1} N_{sc,data}^{RB}(i, j)$, wherein $N_{symb,b,f,c}^{PUSCH}(i)$ represents a quantity of OFDM symbols of a transmission occasion i of a PUSCH in each of the N time domain resources, and $N_{sc,data}^{RB}(i, j)$ represents a quantity of REs other than REs for a reference signal on an OFDM symbol j of the transmission occasion i of the PUSCH in each of the N time domain resources.

9. The transmit power determining method according to claim 1, wherein N is any one of: 2, 4, 8, 10, or 20.

10. A communication apparatus, wherein the communication apparatus comprises:

at least one processor;
one or more memories coupled to the at least one processor and storing programming instructions for execution by the at least one processor to:
determine a first transmit power based on N time domain resources corresponding to a first transport block, wherein the first transmit power is a transmit power of the first transport block on each of the N time domain resources, a size of the N time domain resources is greater than one slot, one slot includes 14 orthogonal frequency division multiplexing (OFDM) symbols, and N is a positive integer; and
send the first transport block on the N time domain resources at the first transmit power;
wherein the first transmit power satisfies the following formula:

$P=\min\{P_{CMAX}, P_O+10 \log_{10}(2\mu \times M_{RB,b,f,c}^{PUSCH}(i)) + \alpha \times PL + \Delta + F\}$ [dBm], wherein P represents the first transmit power, $P_{CMAX}$ represents maximum transmit power of the first transport block, $P_O$ represents target power of the first transport block, $\mu$ represents an index of a subcarrier spacing, $M_{RB,b,f,c}^{PUSCH}(i)$ represents a quantity of resource blocks (RBs) on a physical uplink shared channel (PUSCH), a is indicated by msgA-Alpha, msg3-Alpha or alpha, or a is 1, PL represents a path loss estimate, $\Delta$ represents an offset of transmit power of the first transport block, and F represents an accumulated power adjustment value of the transmit power of the first transport block; and one or more of $P_O$, $\alpha \times PL$, $\Delta$, or F is determined by N.

11. The communication apparatus according to claim 10, wherein the N time domain resources comprise K orthogonal frequency division multiplexing (OFDM) symbols, the K OFDM symbols occupy at least two slots, and K is a positive integer greater than 14; or the N time domain resources comprise N slots, wherein N is an integer greater than 1.

12. The communication apparatus according to claim 10, wherein the first transmit power is further determined based on at least one piece of the following information: a frequency domain resource corresponding to the first transport block, a modulation order of the first transport block, a target coding rate of the first transport block, or a size of the first transport block.

13. The communication apparatus according to claim 10, wherein a physical channel corresponding to the first transport block comprises a physical uplink shared channel (PUSCH); and $P_{CMAX}=P_{CMAX,f,c}(i)$, $P_O=P_{O\_PUSCH,b,f,c}(j)$, $\alpha \times PL=\alpha_{b,f,c}(j) \times PL_{b,f,c}(q_d)$, $\Delta=\Delta_{TF,f,c}(j)$, and $F=f_{b,f,c}(i, l)$, wherein f represents an index of a carrier, c represents an index of a serving cell, i represents an index of a transmission occasion, b represents an index of an active uplink bandwidth part, j represents an index of a parameter set configuration, $q_d$ represents an index of a reference signal, and/represents an index of a power control adjustment state.

14. The communication apparatus according to claim 10, wherein $P_O$ satisfies the following formula:

$P_O=P_{O\_NOMINAL}+P_{O\_UE}$, wherein at least one of $P_{O\_NOMINAL}$ or $P_{O\_UE}$ is determined by a function of N.

15. The communication apparatus according to claim 14, wherein:
the function of N is $10 \log_{10}(N)$; or
the function of N is-round $(10 \log_{10}(N))$; or
the function of N is $1/(N+1)$.

16. The communication apparatus according to claim 10, wherein $\Delta$ satisfies the following formula:

$$\Delta = 10 \log_{10}(2^{BPRE \times K_s} - 1) \times \beta_{offset}); \text{ and}$$

$$BPRE = \Sigma_{r=0}^{C-1} K_r / N_{RE}, \text{ wherein}$$

C represents a quantity of code blocks corresponding to the first transport block; $K_r$ represents a size of an $r^{th}$ code block; $N_{RE}$ represents a quantity of resource elements (REs) corresponding to the first transport block; $N_{RE}$ is determined by a quantity of OFDM symbols of the first transport block in an $s^{th}$ time domain resource, wherein the $s^{th}$ time domain resource is comprised in the N time domain resources; or $N_{RE}$ is determined by a quantity of OFDM symbols of the first transport block in each of the N time domain resources; $K_s$ is configured by a network device or is defined in a protocol; and $\beta_{offset}$ is an offset.

17. The communication apparatus according to claim 16, wherein $N_{RE}$ satisfies the following formula:

$$N_{RE} = M_{RB,b,f,c}^{PUSCH}(i) \times \Sigma_{s=0}^{N-1} \Sigma_{j=0}^{N_{symb,b,f,c}^{PUSCH}-1} NR_{sc,data}^{RB}(i, j, s), \text{ wherein}$$

$N_{symb,b,f,c}^{PUSCH}(i, s)$ represents a quantity of OFDM symbols of a transmission occasion i of a PUSCH in the $s^{th}$ time domain resource, $N_{sc,data}^{RB}(i, j, s)$ represents a quantity of REs other than REs for a reference signal on an OFDM symbol j of the transmission occasion i of the PUSCH in the $s^{th}$ time domain resource, and the $s^{th}$ time domain resource is comprised in the N time domain resources; or $N_{RE}$ satisfies the following formula:

$$N_{RE} = M_{RB,b,f,c}^{PUSCH}(i) \times N \times \Sigma_{j=0}^{N_{symb,b,f,c}^{PUSCH}-1} N_{sc,data}^{RB}(i, j), \text{ wherein}$$

$N_{symb,b,f,c}^{PUSCH}(i)$ represents a quantity of OFDM symbols of a transmission occasion i of a PUSCH in each of the N time domain resources, and $N_{sc,data}^{RB}(i, j)$ represents a quantity of REs other than REs for a reference signal on an OFDM symbol j of the transmission occasion i of the PUSCH in each of the N time domain resources.

18. The communication apparatus according to claim 10, wherein N is any one of: 2, 4, 8, 10, or 20.

19. A non-transitory computer-readable storage medium, wherein the non-transitory computer-readable storage medium stores computer program which, when executed by a computer, causes the computer to carry out operations comprising:
determining a first transmit power based on N time domain resources corresponding to a first transport block, wherein the first transmit power is a transmit power of the first transport block on each of the N time domain resources, a size of the N time domain resources is greater than one slot, one slot includes 14 orthogonal frequency division multiplexing (OFDM) symbols, and N is a positive integer; and
sending the first transport block on the N time domain resources at the first transmit power;
wherein the first transmit power satisfies the following formula:

$$P = \min\{P_{CMAX}, P_O + 10 \log_{10}(2^u \times M_{RB,b,f,c}^{PUSCH}(i)) + \alpha \times PL + \Delta + F\} \text{ [dBm], wherein}$$

P represents the first transmit power, $P_{CMAX}$ represents maximum transmit power of the first transport block, $P_O$ represents target power of the first transport block, u represents an index of a subcarrier spacing, $M_{RB,b,f,c}^{PUSCH}(i)$ represents a quantity of resource blocks (RBs) on a physical uplink shared channel (PUSCH), $\alpha$ is indicated by msgA-Alpha, msg3-Alpha or alpha, or a is 1, PL represents a path loss estimate, $\Delta$ represents an offset of transmit power of the first transport block, and F represents an accumulated power adjustment value of the transmit power of the first transport block; and
one or more of $P_O$, $\alpha \times PL$, $\Delta$, or F is determined by N.

* * * * *